United States Patent
Isono

(10) Patent No.: US 9,156,443 B2
(45) Date of Patent: Oct. 13, 2015

(54) DISK BRAKE DEVICE

(75) Inventor: Hiroshi Isono, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 325 days.

(21) Appl. No.: 13/636,939

(22) PCT Filed: Mar. 24, 2010

(86) PCT No.: PCT/JP2010/055773
§ 371 (c)(1),
(2), (4) Date: Dec. 3, 2012

(87) PCT Pub. No.: WO2011/118046
PCT Pub. Date: Sep. 29, 2011

(65) Prior Publication Data
US 2013/0068572 A1    Mar. 21, 2013

(51) Int. Cl.
*F16D 65/18* (2006.01)
*B60T 1/06* (2006.01)
(Continued)

(52) U.S. Cl.
CPC .............. *B60T 1/06* (2013.01); *F16D 55/226* (2013.01); *F16D 65/18* (2013.01); *F16D 2121/02* (2013.01); *F16D 2125/06* (2013.01); *F16D 2127/02* (2013.01)

(58) Field of Classification Search
CPC ......... F16D 65/18; F16D 65/72; F16D 65/74; F16D 65/52; F16D 2125/08
See application file for complete search history.

(56) References Cited

U.S. PATENT DOCUMENTS

RE28,603 E  *  11/1975  Farr .......................... 188/196 R
4,058,084 A  *  11/1977  Kawaguchi et al. ......... 188/71.8
(Continued)

FOREIGN PATENT DOCUMENTS

EP    1 948 954    7/2008
JP    62 30029     2/1987
(Continued)

OTHER PUBLICATIONS

International Search Report Issued Aug. 10, 2010 in PCT/JP10/55773 Filed Mar. 24, 2010.
(Continued)

*Primary Examiner* — Bradley King
(74) *Attorney, Agent, or Firm* — Oblon, McClelland, Maier & Neustadt, L.L.P.

(57) ABSTRACT

A cylinder portion formed in a caliper supports a pressure receiving portion and a pressing portion of a piston so as to allow the pressure receiving portion and the pressing section to advance and retreat. The piston is provided with a retraction mechanism. The retraction mechanism includes a reversing member for generating a reversing force when compressed by the pressure receiving portion and the pressing portion. The mechanism further includes a movable element moved in a retreating stroke due to the reversing force, and a first elastic member for generating a restoring force and imparting the restoring force, the first elastic member generating the restoring force when compressed by the movable element and the pressure receiving portion which is moved in an advancing stroke. The mechanism further includes a second elastic member for generating a frictional force for maintaining the compression and deformation of the first elastic member. The reversing member generates the reversing force along with the advance of the pressure receiving portion, the movable element relatively retreats due to the reversing force and compresses the first elastic member, and the generated restoring force returns the pressure receiving portion and the pressing portion along with a decrease in pressure of a brake fluid.

1 Claim, 25 Drawing Sheets

(51) Int. Cl.
*F16D 55/226* (2006.01)
*F16D 121/02* (2012.01)
*F16D 125/06* (2012.01)
*F16D 127/02* (2012.01)

(56) References Cited

U.S. PATENT DOCUMENTS

| | | | | |
|---|---|---|---|---|
| 4,336,746 | A * | 6/1982 | Morith | 92/130 B |
| 4,373,614 | A * | 2/1983 | Runkle | 188/72.3 |
| 4,475,632 | A * | 10/1984 | Feldmann et al. | 188/71.4 |
| 5,485,902 | A * | 1/1996 | Berwanger | 188/196 A |
| 8,225,910 | B2 * | 7/2012 | Piccoli et al. | 188/71.8 |
| 8,631,914 | B2 * | 1/2014 | Henricksen | 188/152 |
| 2010/0096221 | A1 * | 4/2010 | Vezzoli et al. | 188/72.3 |

FOREIGN PATENT DOCUMENTS

| | | |
|---|---|---|
| JP | 5 65929 | 3/1993 |
| JP | 7 253128 | 10/1995 |
| JP | 10 331886 | 12/1998 |
| JP | 2009 156292 | 7/2009 |
| JP | 2009 185976 | 8/2009 |
| WO | 2010 029768 | 3/2010 |
| WO | WO 2011/059778 A1 | 5/2011 |

OTHER PUBLICATIONS

Extended European Search Report issued Mar. 19, 2015 in Patent Application No. 10848438.7.

* cited by examiner

DISK BRAKE DEVICE

TECHNICAL FIELD

The present invention relates to a disc brake device for applying a braking force to a wheel via a disc rotor using a frictional resistance generated by squeezing the disc rotor rotating integrally with the wheel through use of friction pads provided to a caliper.

BACKGROUND ART

In a general floating caliper disc brake device, a caliper arranged astride a disc rotor is supported on a mounting bracket. Further, a pair of slide pins is provided to the caliper, and fitting holes to which the pair of slide pins is slidably fitted are provided to the mounting bracket. Accordingly, the slide pins slide along the fitting holes so that the caliper is movable in a rotational axis direction of a wheel. In addition, an inner pad (friction pad) is movably supported on one side of the caliper, and an outer pad (friction pad) is fixed on the other side thereof. Moreover, a piston and a cylinder are provided to the caliper so as to press the inner pad on one side against the disc rotor (bring the inner pad into press contact with the disc rotor).

In such a floating caliper disc brake device, when a driver steps on a brake pedal, the piston supported on the cylinder advances in accordance with a leg power thus generated so that the inner pad is pressed against the disc rotor (the inner pad is brought into press contact with the disc rotor). Further, the caliper moves in the rotational axis direction of the wheel due to a reaction force generated through the advance of the piston so that the outer pad is pressed against the disc rotor (the outer pad is brought into press contact with the disc rotor). Accordingly, the inner pad and the outer pad can squeeze the disc rotor, and can therefore apply a braking force to the wheel via the disc rotor rotating integrally with the wheel.

By the way, the piston provided to the caliper is movably supported on the cylinder that is formed in the caliper, and is retained by a piston seal in a fluid tight manner. When a hydraulic fluid (brake fluid) is supplied at the time of braking to a hydraulic pressure chamber that is formed in the cylinder, the piston advances while deforming the piston seal, and when the hydraulic pressure is released (removed) from the hydraulic pressure chamber, the piston retreats toward the hydraulic pressure chamber due to a restoring force of the deformed piston seal. However, when the leg power of the driver applied to the brake pedal is excessively large, for example, along with the increase in hydraulic pressure in the hydraulic pressure chamber, the piston is pushed toward the disc rotor to a higher extent than in a predetermined setting. Hence, a relative movement occurs between the piston and the piston seal, which may hinder the piston from retreating sufficiently due to the restoring force of the piston seal. In this case, there may occur such a phenomenon that the inner pad or the outer pad is continuously held in contact with the disc rotor, that is, a so-called drag phenomenon. Further, when the drag phenomenon occurs as described above, there may occur so-called knockback, in which the inner pad or the outer pad is knocked by the rotating disc rotor and therefore the piston is pushed backward.

To address those problems, for example, a disc brake device disclosed in JP 07-253128 A, a disc brake caliper disclosed in JP 05-65929 A, a disc brake device disclosed in JP 2009-156292 A, and a floating disc brake disclosed in JP 2009-185976 A have been known conventionally.

DISCLOSURE OF THE INVENTION

By the way, in the above-mentioned conventional disc brake device disclosed in JP 07-253128 A, the clearance between the piston and the friction pad (disc rotor) may fluctuate due to a pressure history, knock back, wear of the pad, and the like. When the brakes are applied in this state, the position of the retraction ring is not stable, which may hinder the piston from retracting stably. Therefore, even when the drag phenomenon occurs, it may be difficult to eliminate the drag phenomenon, and further, when a clearance larger than a predefined value is formed between the piston and the pad (disc rotor), it may be difficult to correct the clearance to the predefined value.

Further, in the above-mentioned conventional disc brake caliper disclosed in JP 05-65929 A, when the brake pad is worn and the brake fluid pressure is high, a relative movement occurs between the piston and the retraction ring. Accordingly, the piston may advance to a higher extent than the compression amount of the belleville spring, and the piston cannot be retracted appropriately. As a result, the drag phenomenon of the pad may occur.

That is, in the above-mentioned conventional disc brake device and disc brake caliper, the piston is returned by the piston seal. However, the restoring force of the piston seal alone may be insufficient to return the piston, and as a result, the drag phenomenon of the pad may occur.

In this respect, in the above-mentioned conventional disc brake device disclosed in JP 2009-156292 A, the pad is retracted by sucking air in the expandable and contractible bellows disposed inside the piston.

Further, in the conventional floating disc brake disclosed in JP 2009-185976 A, the guide bush is provided to the caliper slide pin so that the clearance between the pad and the disc rotor is ensured.

However, in the above-mentioned conventional disc brake device and floating disc brake, when the wear state of the pad changes, there is a risk that a stable clearance cannot be ensured. Further, in the above-mentioned conventional disc brake device and floating disc brake, in order to ensure an appropriate clearance, it may be necessary to determine and adjust, for each vehicle, the force for sucking the pad by the bellows and the amount of controlling the clearance by the guide bush.

The present invention has been made to solve the above-mentioned problems, and it is therefore an object thereof to provide a disc brake device for suppressing the drag phenomenon of the pad by appropriately returning the piston with a simple structure.

In order to achieve the above-mentioned object, the present invention has a feature as follows. There is provided a disc brake device, including: a disc rotor which rotates integrally with a wheel about a rotational axis; and a caliper including: a piston for pressing friction pads, which are opposed to friction surfaces of the disc rotor, toward the friction surfaces along with an increase in pressure of a brake fluid; and a cylinder for supporting the piston in a fluid tight manner so as to allow the piston to advance and retreat, the disc brake device further including a retraction mechanism provided to the piston, the retraction mechanism being configured to use the pressure of the brake fluid supplied to the cylinder for advancing the piston, and to retreat the piston, which has advanced for pressing the friction pads, along with a decrease in the pressure of the brake fluid.

In this case, it is preferred that the retraction mechanism include reversing means for reversing an advancing force for advancing the piston along with the increase in the pressure of the supplied brake fluid into a reversing force to be applied in a retreating direction of the piston, and the retraction mechanism be configured to use the reversing force generated through the reversing by the reversing means, and to retreat the piston, which has advanced for pressing the friction pads, along with the decrease in the pressure of the brake fluid.

In this case, it is preferred that the retraction mechanism further include: reversing force transferring means for transferring the reversing force generated by the reversing means in the retreating direction of the piston; and restoring force imparting means which is provided between the piston and the reversing force transferring means, and is deformed by the piston which advances due to the advancing force and the reversing force transferring means to impart a restoring force generated against the deformation to the piston.

In addition, in this case, it is preferred that, for example, the reversing force transferring means be relatively stroked in the retreating direction of the piston to transfer the reversing force generated by the reversing means. Specifically, it is preferred that, for example, the reversing force transferring means be relatively stroked in the retreating direction of the piston by an amount larger than an advancing stroke of the piston to transfer the reversing force generated by the reversing means. Moreover, in this case, it is preferred that, for example, the restoring force imparting means be made of an elastic material which is compressed and elastically deformed by the piston which advances due to the advancing force and the reversing force transferring means.

Further, it is preferred that the retraction mechanism further include deformation maintaining means for maintaining the deformation of the restoring force imparting means along with the decrease in the pressure of the brake fluid. In addition, in this case, specifically, it is preferred that, for example, the deformation maintaining means be provided to the reversing force transferring means, and be configured to generate a frictional force for maintaining a state in which the reversing force transferring means transfers the reversing force.

Further, it is preferred that the reversing means be viscoelastically deformed by the advancing piston to reverse the advancing force into the reversing force, and the retraction mechanism be configured to use the reversing force generated through the reversing by the reversing means, and to retreat the piston, which has advanced for pressing the friction pads, along with the decrease in the pressure of the brake fluid.

Further, it is preferred that the reversing means be deformed in a snapping manner by the advancing piston to reverse the advancing force into the reversing force, and the retraction mechanism be configured to use the reversing force generated through the reversing by the reversing means, and to retreat the piston, which has advanced for pressing the friction pads, along with the decrease in the pressure of the brake fluid.

Further, it is preferred that the reversing means be configured to reverse, as the reversing force, the pressure of the brake fluid supplied for generating the advancing force of the piston, and the retraction mechanism be configured to use the pressure of the brake fluid, which is reversed as the reversing force by the reversing means, and to retreat the piston, which has advanced for pressing the friction pads, along with the decrease in the pressure of the brake fluid.

In this case, it is preferred that, for example, the retraction mechanism further include: sealing means for sealing the pressure of the brake fluid, which is reversed by the reversing means, at a position between an inner peripheral surface of the cylinder and an outer peripheral surface of the piston; reversing force transferring means which slides in the retreating direction of the piston due to the reversed pressure of the brake fluid; restoring force imparting means which is provided between the piston and the reversing force transferring means, and is compressed by the piston which advances due to the advancing force and the reversing force transferring means to impart a restoring force generated against the compression and deformation to the piston; and deformation maintaining means for maintaining the compression and deformation of the restoring force imparting means along with the decrease in the pressure of the brake fluid. In addition, it is preferred that the sealing means, the restoring force imparting means, and the deformation maintaining means be formed integrally.

Further, it is preferred that the piston include: a pressure receiving portion which advances by receiving the pressure of the supplied brake fluid; and a pressing portion for pressing the friction pads, the pressing portion housing the pressure receiving portion so as to allow the pressure receiving portion to advance and retreat integrally with the pressing portion, the reversing means be arranged between the pressure receiving portion and the pressing portion, and the retraction mechanism be configured to use the reversing force generated by the reversing means, which reverses the advancing force for advancing the pressure receiving portion, and to integrally retreat the pressure receiving portion and the pressing portion, which have advanced for pressing the friction pads, along with the decrease in the pressure of the brake fluid.

In addition, it is preferred that the disc brake device further include a center shaft formed inside the piston at the cylinder which houses the piston in the fluid tight manner, the center shaft extending in an advancing and retreating direction of the piston, the reversing means and the reversing force transferring means be provided to the center shaft, and the restoring force imparting means be deformed by the piston and the reversing force transferring means provided to the center shaft to impart the restoring force to the piston.

Accordingly, the retraction mechanism for returning the piston that has advanced for pressing the friction pads may be provided to the piston. Further, the retraction mechanism may include the reversing means for reversing the advancing force of the piston, which is generated along with the supply of the brake fluid pressure, into the reversing force to be applied in the retreating direction of the piston. As a result, it is possible to retreat the piston by deforming the restoring force imparting means with use of the reversing force generated by the reversing means (that is, brake fluid pressure).

Accordingly, the reversing force transferring means is stroked in the retreating direction relative to the advancing piston due to, for example, the reversing force generated by the reversing means to compress and deform the restoring force imparting means, with the result that the restoring force generated against the deformation can be imparted to the advanced piston. Thus, the restoring force can be imparted constantly from the advancing position of the piston, and hence the piston can be returned stably. Therefore, the friction pads are returned to positions with a predetermined clearance from the disc rotor, with the result that the drag phenomenon of the friction pads can be suppressed, and a stable brake feeling can be obtained.

Further, the restoring force can be imparted constantly from the advancing position of the piston. Therefore, for example, there is no need to adjust the returning amount (that is, retracting amount) of the piston for each vehicle, and the development cost can be reduced as well.

Further, the retraction mechanism may be provided to the piston, and hence there is no need to perform processing separately on, for example, the cylinder (that is, caliper) that houses the piston in a fluid tight manner. Thus, the conventionally used caliper can be utilized, and the manufacturing cost can be reduced.

Further, the reversing force can be generated through viscoelastic deformation or snapping deformation of the reversing means along with the advance of the piston, or through the reversing of the pressure of the supplied brake fluid. Thus, the reversing force can be generated reliably with a significantly simple structure, and the manufacturing cost can be reduced.

Further, the reversing force can be generated as described above, and hence the reversing force transferring means can be stroked in the retreating direction due to, for example, the reversing force imparted thereto. Accordingly, the restoring force imparting means can impart the restoring force to the piston to return (retreat) the piston. Thus, the friction pads are returned to the positions with a predetermined clearance from the disc rotor, with the result that the drag phenomenon of the friction pads can be suppressed, and a stable brake feeling can be obtained.

BEST MODE FOR CARRYING OUT THE INVENTION a. First Embodiment

Figure 1:
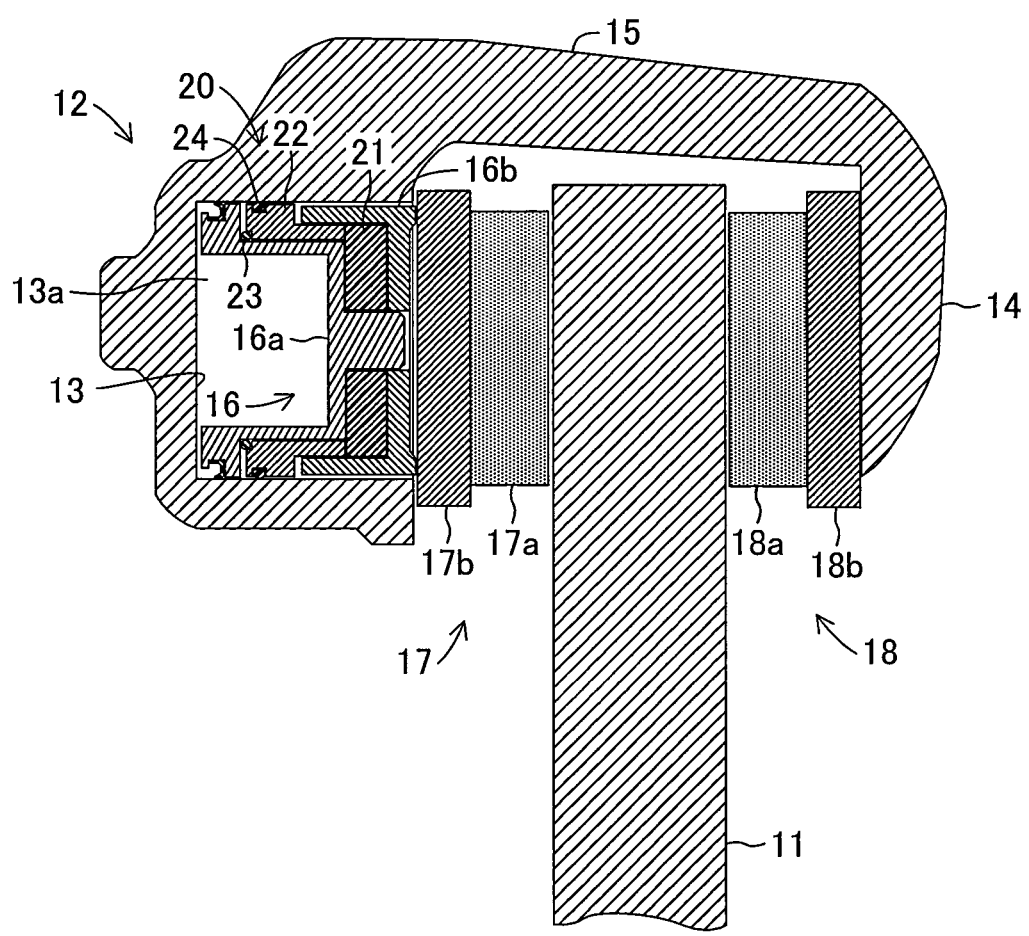
FIG. 1 is a schematic view of a disc brake device which is common to embodiments of the present invention.

In the following, embodiments of the present invention are described in detail with reference to the drawings. FIG. 1 schematically illustrates a floating caliper disc brake device which is common to the respective embodiments of the present invention.

The disc brake device includes a disc rotor 11 which rotates integrally with a wheel (not shown) about a rotational axis of an axle, and a caliper 12 which is supported by a mounting bracket (not shown) fixed to a vehicle body side so as to be movable along a rotational axis direction of the disc rotor 11.

The caliper 12 has a substantially U-shaped cross section astride the disc rotor 11, and includes a cylinder portion 13 which is supplied with a brake fluid in response to a braking operation performed by a driver, a claw portion 14 arranged at a position opposed to the cylinder portion 13 through an intermediation of the disc rotor 11, and a coupling portion 15 for coupling the cylinder portion 13 and the claw portion 14 to each other. Further, the cylinder portion 13 supports a piston 16 in a fluid tight manner so as to allow the piston 16 to advance and retreat.

Figure 2:
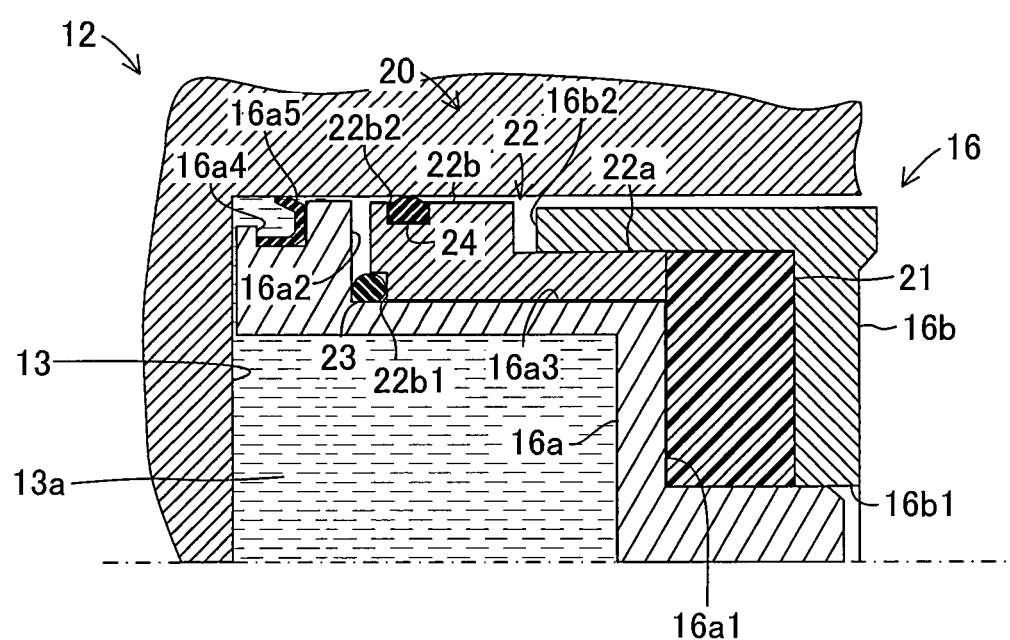
FIG. 2 is an enlarged schematic view for illustrating a retraction mechanism according to a first embodiment of the present invention.

As illustrated in FIGS. 1 and 2, the piston 16 includes a pressure receiving portion 16a for receiving a pressure of the brake fluid supplied to the cylinder portion 13, and a pressing portion 16b for pressing a friction pad 17 described later. As illustrated in FIG. 2, the pressure receiving portion 16a is formed into a cylindrical shape including a first stepped portion 16a1 which is small in diameter, a second stepped portion 16a2 which is large in diameter, and a coupling portion 16a3 for coupling the first stepped portion 16a1 and the second stepped portion 16a2 to each other. Further, an annular seal groove 16a4 is formed in an outer peripheral surface of the second stepped portion 16a2. The seal groove 16a4 houses a seal member (for example, lip packing) 16a5 for preventing leakage of the brake fluid at a position between the seal member 16a5 and an inner peripheral surface of the cylinder portion 13. Accordingly, a hydraulic pressure chamber 13a filled with the brake fluid which is adjusted in pressure is defined in the cylinder portion 13. Further, the pressing portion 16b is formed into a substantially C-shaped cross section, and at a substantially center part of a pressing surface thereof, the pressing portion 16b has a through hole 16b1 formed therein, which houses a columnar distal end part of the pressure receiving portion 16a so that the pressing portion 16b is frictionally slidable along the distal end portion. Further, a retraction mechanism 20 described later is provided to the piston 16 thus formed of the pressure receiving portion 16a and the pressing portion 16b.

Further, as illustrated in FIG. 1, a pair of friction pads 17 and 18 is assembled to the caliper 12 so as to be opposed to and brought into frictional engagement with friction surfaces of the disc rotor 11 on both sides thereof, respectively. The friction pads 17 and 18 are arranged on the cylinder portion 13 side and the claw portion 14 side of the caliper 12, respectively. In the following description, the friction pad 17 arranged on the cylinder portion 13 side of the caliper 12 and pressed by the pressing portion 16b of the piston 6 is referred to as "inner pad 17", and the friction pad 18 arranged on the claw portion 14 side of the caliper 12 is referred to as "outer pad 18". Although detailed description is omitted, proximal end portions of friction materials 17a and 18a of the inner pad 17 and the outer pad 18 are fixed to back plates 17b and 18b, respectively. Although illustration is omitted, the caliper 12 may be provided with a mechanism for returning the inner pad 17 and the outer pad 18 held in press contact with the friction surfaces of the disc rotor 11 in separating directions (for example, spring mechanism).

As illustrated in detail in FIG. 2, the retraction mechanism 20 according to the first embodiment includes a disc-like reversing member 21 as reversing means, which is arranged between the first stepped portion 16a1 formed in the pressure receiving portion 16a of the piston 16 and an inner peripheral surface of the pressing portion 16b of the piston 16, and has a diameter larger than an outer diameter of the coupling portion 16a3 and smaller than an inner diameter of the pressing portion 16b. The reversing member 21 is made of a viscoelastic material (for example, rubber material which is small in hardness), and is molded into a predetermined thickness. Further, the retraction mechanism 20 includes a movable element 22 as reversing force transferring means, which is assembled onto an outer peripheral surface of the coupling portion 16a3 forming the pressure receiving portion 16a of the piston 16 so as to be capable of advancing and retreating. The movable element 22 is formed into a cylindrical shape (sleeve shape) including a thin portion 22a housed between the outer peripheral surface of the coupling portion 16a3 and the inner peripheral surface of the pressing portion 16b, and a thick portion 22b shiftable between the second stepped portion 16a2 of the pressure receiving portion 16a and an end surface 16b2 of the pressing portion 16b.

The thin portion 22a is abuttable against the reversing member 21 on a distal end side thereof. Further, the thin portion 22a has a thickness which is set smaller than a radial length of the first stepped portion 16a1 forming the pressure receiving portion 16a of the piston 16. That is, an area of contact of the distal end portion of the thin portion 22a with the reversing member 21 is set smaller than an area of contact of the first stepped portion 16a1 with the reversing member 21. The thick portion 22b has an annular housing stepped portion 22b1 formed on an inner peripheral surface side thereof, and the housing stepped portion 22b1 houses a first elastic member 23 as restoring force imparting means. Further, the thick portion 22b has an annular housing groove portion 22b2 formed on an outer peripheral surface side thereof, and the housing groove portion 22b2 houses a second elastic member 24 as deformation maintaining means.

The first elastic member 23 is molded into a ring shape from a highly elastic material (for example, rubber material). When the first elastic member 23 is elastically deformed by an inner peripheral surface of the housing stepped portion 22b1 of the movable element 22 and by the second stepped portion 16a2, the first elastic member 23 generates an elastic force (restoring force) in accordance with the elastic deformation. Note that, as the first elastic member 23, an O-ring having a substantially O-shaped cross section or a D-ring (not shown) having a substantially D-shaped cross section may be employed.

The second elastic member 24 is molded into a ring shape from a high friction elastic material (for example, rubber material), and is housed so as to generate, for the inner peripheral surface of the cylinder portion 13, a predetermined pressing force, that is, a predetermined compressing force, between the second elastic member 24 and an inner peripheral surface of the housing groove portion 22b2 of the movable element 22. The second elastic member 24 generates a predetermined magnitude of frictional force against the shift of the movable element 22. Note that, as the second elastic member 24, a D-ring having a substantially D-shaped cross section or an O-ring (not shown) having a substantially O-shaped cross section may be employed.

Next, a basic operation of the retraction mechanism 20 structured as described above is described. When the brake fluid is supplied to the cylinder portion 13 and the brake fluid pressure in the hydraulic pressure chamber 13a is increased, the pressure receiving portion 16a of the piston 16 advances toward the pressing portion 16b. When the pressing portion 16b presses the inner pad 17 to bring the inner pad 17 into press contact with the friction surface of the disc rotor 11, in accordance with the brake fluid pressure in the hydraulic pressure chamber 13a, the reversing member 21 of the retraction mechanism 20 is compressed by an outer surface of the first stepped portion 16a1 of the pressure receiving portion 16a and by the inner peripheral surface of the pressing portion 16b.

Figure 3:
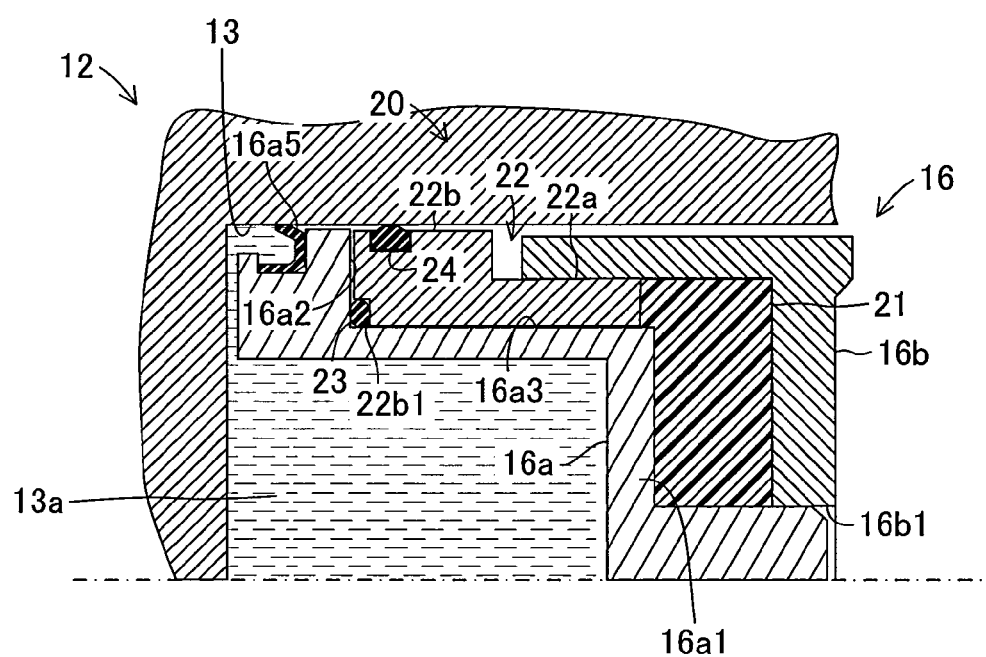
FIG. 3 is a view for illustrating that the retraction mechanism of FIG. 2 returns a piston when an advancing amount of the piston relative to a cylinder is small.

In this case, as illustrated in FIG. 2, the reversing member 21 is housed in a space which is formed of the outer peripheral surface at the distal end portion of the pressure receiving portion 16a, the inner peripheral surface of the pressing portion 16b, the outer surface of the first stepped portion 16a1, and the distal end surface of the thin portion 22a of the movable element 22 (the space formed in this manner is hereinafter referred to as "housing space"). Therefore, when the reversing member 21 is compressed in the housing space by the outer surface of the first stepped portion 16a1, as illustrated in FIG. 3, due to a viscoelastic characteristic thereof, the reversing member 21 applies a reversing force to the distal end surface of the thin portion 22a of the movable element 22 so as to relatively shift the distal end surface of the thin portion 22a in a retreating direction opposite to an advancing direction of the pressure receiving portion 16a (piston 16).

More specifically, the reversing member 21 is housed in the housing space surrounded by the outer peripheral surface at the distal end portion of the pressure receiving portion 16a and the inner peripheral surface of the pressing portion 16b, which are formed as non-deformable members, and further surrounded by the outer surface of the first stepped portion 16a1 of the pressure receiving portion 16a and the distal end surface of the thin portion 22a of the movable element 22, which are shiftable in the advancing and retreating directions of the piston 16. Therefore, in order to relieve, from the housing space, the part of the reversing member 21 corresponding to a volume of the first stepped portion 16a1 of the pressure receiving portion 16a which enters the housing space, as illustrated in FIG. 3, the reversing member 21 made of the viscoelastic material is deformed so as to push back the distal end surface of the thin portion 22a of the movable element 22. That is, the reversing member 21 exerts a reversing force generating function of generating the reversing force to be imparted to the movable element 22 by reversing an advancing force (brake fluid pressure) for advancing the pressure receiving portion 16a.

At this time, the area of contact of the distal end surface of the thin portion 22a with the reversing member 21 is set smaller than the area of contact of the first stepped portion 16a1 with the reversing member 21. Therefore, when the first stepped portion 16a1 enters the housing space, the reversing member 21 relatively shifts (strokes) the movable element 22 in the direction opposite to the advancing direction of the pressure receiving portion 16a (piston 16), that is, in the retreating direction of the pressure receiving portion 16a (piston 16), by a pushback amount (retreating stroke amount) larger than an entrance amount (advancing stroke amount) of the first stepped portion 16a1.

Further, in the retraction mechanism 20, the first elastic member 23 is arranged between the housing stepped portion 22b1 formed in the thick portion 22b of the movable element 22 and the second stepped portion 16a2 of the pressure receiving portion 16a. Therefore, when the movable element 22 subjected to the reversing force imparted from the reversing member 21 retreats relative to the advance of the pressure receiving portion 16a as illustrated in FIG. 3, the first elastic member 23 is compressed and elastically deformed between the movable element 22 and the second stepped portion 16a2. That is, the movable element 22 exerts a reversing force transferring function of transferring the reversing force from the reversing member 21 to the first elastic member 23.

Accordingly, the first elastic member 23 can impart an elastic force (restoring force) in accordance with a relative shift amount between the movable element 22 and the pressure receiving portion 16a, in other words, a compression amount, to the movable element 22 and the second stepped portion 16a2. Thus, the first elastic member 23 exerts a restoring force imparting function. In this case, the relative shift amount of the movable element 22 to the pressure receiving portion 16a is restricted by the maximum elastic deformation amount of the first elastic member 23 (or abutment between a distal end of the housing stepped portion 22a and the second stepped portion 16a2). That is, the relative shift amount of the movable element 22 to the pressure receiving portion 16a, which is restricted by the maximum elastic deformation amount of the first elastic member 23, corresponds to a returning amount (retracting amount) for returning the pressure receiving portion 16a (piston 16).

Further, in the retraction mechanism 20, the second elastic member 24 is housed in the housing groove portion 22b2 formed in the thick portion 22b of the movable element 22, and generates a predetermined frictional force between the second elastic member 24 and the inner peripheral surface of the cylinder portion 13. Therefore, when the brake fluid pressure in the hydraulic pressure chamber 13a is decreased and the reversing force is not imparted to the movable element 22, the shift of the movable element 22 relative to the inner peripheral surface of the cylinder portion 13 is suppressed due to the frictional force that is generated by the second elastic member 24, and the deformation of the first elastic member 23 is maintained. That is, the second elastic member 24 exerts a frictional force generating function (deformation maintaining function). Accordingly, in a situation in which the first elastic member 23 is compressed and may therefore impart the restoring force, the shift of the movable element 22 is suppressed due to a large frictional force generated by the second elastic member 24, and hence the restoring force generated by the first elastic member 23 is transferred to the pressure receiving portion 16a via the second stepped portion 16a2, and is applied as a returning force for retreating the piston 16 in a direction separating from the inner pad 17.

Next, an operation of the disc brake device according to the first embodiment structured as described above is described. In the disc brake device, at the time of pressurization at which the brake fluid is supplied to the cylinder portion 13 of the caliper 12 and the brake fluid pressure in the hydraulic pressure chamber 13a of the cylinder portion 13 is increased, the pressure receiving portion 16a of the piston 16 advances toward the pressing portion 16b, and the pressing portion 16b advances in a direction toward the disc rotor 11 due to the advancing force that is transferred via the reversing member 21. Accordingly, the pressing portion 16b presses the inner pad 17 to bring the inner pad 17 into press contact with the friction surface of the disc rotor 11. At this time, the caliper 12 moves in a direction opposite to the moving direction of the piston 16 due to reaction occurring along with the advance of the pressure receiving portion 16a and the pressing portion 16b (that is, piston 16), to thereby bring the outer pad 18, which is assembled to the claw portion 14, into press contact with the friction surface of the disc rotor 11. Accordingly, a frictional resistance force is generated between the inner pad 17 and the rotating disc rotor 11 and between the outer pad 18 and the rotating disc rotor 11 so that the braking force can be imparted to the disc rotor 11, that is, the wheel.

On the other hand, at the time of depressurization at which the brake fluid is discharged from the cylinder portion 13 of the caliper 12 and the brake fluid pressure in the hydraulic pressure chamber 13a of the cylinder portion 13 is decreased, the retraction mechanism 20 causes the pressure receiving portion 16a and the pressing portion 16b (that is, piston 16) to retreat in the direction separating from the disc rotor 11 (inner pad 17), to thereby cause the inner pad 17 to separate from the friction surface of the disc rotor 11. At this time, the caliper 12 moves in a direction opposite to the moving direction of the piston 16 due to reaction occurring along with the retreat of the piston 16, to thereby cause the outer pad 18, which is assembled to the claw portion 14, to separate from the friction surface of the disc rotor 11.

By the way, in response to the above-mentioned advance and retreat of the pressure receiving portion 16a and the pressing portion 16b (that is, piston 16), the retraction mechanism 20 provided to the piston 16 moves in association with the piston 16 and returns the piston 16 corresponding to the magnitude of the brake fluid pressure in the hydraulic pressure chamber 13a and the wear state of the inner pad 17 (and the outer pad 18). In the following, the operation of the retraction mechanism 20 is described in detail.

First, description is given of a case where the brake fluid pressure in the hydraulic pressure chamber 13a is low at the time of pressurization. In this case, as illustrated in FIG. 3, when the pressure receiving portion 16a of the piston 16 advances in response to the increase in brake fluid pressure in the hydraulic pressure chamber 13a and the first stepped portion 16a1 enters the housing space, the reversing member 21 is compressed. Then, the reversing member 21 imparts the reversing force to the movable element 22 along with the compression.

The movable element 22 retreats relative to the advancing pressure receiving portion 16a due to the reversing force imparted from the reversing member 21 and the frictional force generated by the second elastic member 24 (in other words, is not shifted relative to the inner peripheral surface of the cylinder portion 13), and compresses the first elastic member 23 together with the second stepped portion 16a2 of the pressure receiving portion 16a. Note that, in this case, the brake fluid pressure in the hydraulic pressure chamber 13a is low, and hence the first elastic member 23 is elastically deformed by an elastic deformation amount that is smaller than the maximum elastic deformation amount, and imparts a restoring force in accordance with this elastic deformation amount to the movable element 22 and the second stepped portion 16a2.

When the brake fluid pressure in the hydraulic pressure chamber 13a is removed in this state, the reversing force is not imparted from the reversing member 21, but the shift of the movable element 22 is suppressed due to the frictional force that is generated by the second elastic member 24. As a result, the restoring force generated by the first elastic member 23 is imparted to the pressure receiving portion 16a via the second stepped portion 16a2 so that the pressure receiving portion 16a retreats. Further, the pressing portion 16b is coupled to the distal end portion of the pressure receiving portion 16a via the through hole 16b1 so as to be frictionally slidable along the distal end portion, and hence retreats integrally with the pressure receiving portion 16a. Accordingly, the pressure receiving portion 16a and the pressing portion 16b, that is, the piston 16, are returned by a retracting amount corresponding to the elastic deformation amount of the first elastic member 23.

Next, when the brake fluid pressure in the hydraulic pressure chamber 13a is high at the time of pressurization, as illustrated in FIG. 3, due to the reversing force imparted from the reversing member 21 and the frictional force generated by the second elastic member 24, the movable element 22 elastically deforms the first elastic member 23 up to the maximum elastic deformation amount (or until the distal end of the housing stepped portion 22a of the movable element 22 abuts against the second stepped portion 16a2) together with the second stepped portion 16a2 of the pressure receiving portion 16a. When the brake fluid pressure in the hydraulic pressure chamber 13a is removed in this state, due to the restoring force generated by the first elastic member 23, the pressure receiving portion 16a and the pressing portion 16b, that is, the piston 16, are returned by a retracting amount corresponding to the maximum elastic deformation amount of the first elastic member 23.

Figure 4:
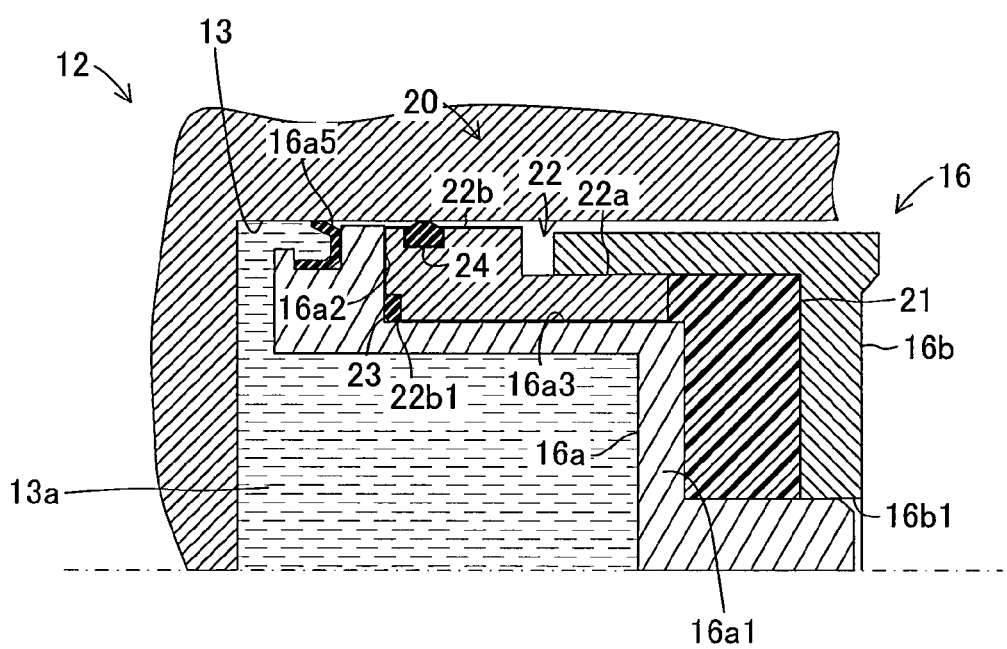
FIG. 4 is a view for illustrating that the retraction mechanism of FIG. 2 returns the piston when the advancing amount of the piston relative to the cylinder is large.

Further, when the brake fluid pressure in the hydraulic pressure chamber 13a is excessively high at the time of pressurization, the advancing amount of the pressure receiving portion 16a and the pressing portion 16b is increased to a higher extent than in a predetermined setting due to, for example, distortion of the back plate 17b forming the inner pad 17, distortion of a spacer (shim plate) provided between an end portion of the pressing portion 16b and the back plate 17b, or distortion of the cylinder portion 13. In this case, in a situation in which the first elastic member 23 is elastically deformed up to the maximum elastic deformation amount (or a situation in which the distal end of the housing stepped portion 22a of the movable element 22 abuts against the second stepped portion 16a2), the movable element 22 cannot sometimes retreat relative to the pressure receiving portion 16a. Thus, in this case, as illustrated in FIG. 4, the retraction mechanism 20 advances in association with the advance of the pressure receiving portion 16a and the pressing portion 16b. However, when the brake fluid pressure in the hydraulic pressure chamber 13a is removed in this state, due to the restoring force generated by the first elastic member 23, the pressure receiving portion 16a and the pressing portion 16b, that is, the piston 16, are returned by a retracting amount corresponding to the maximum elastic deformation amount of the first elastic member 23.

Figure 5:
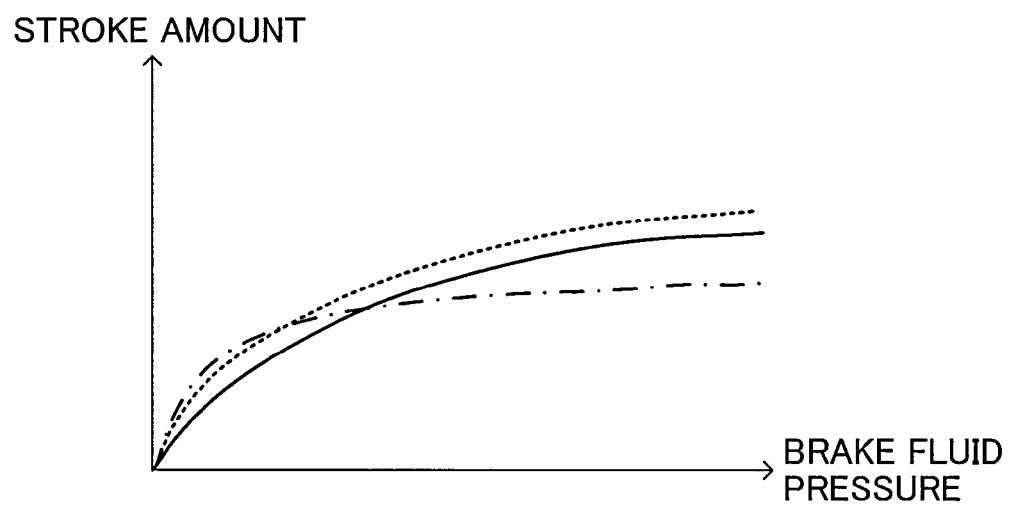
FIG. 5 is a graph for illustrating a relationship of a stroke amount of the piston relative to a brake fluid pressure.

In this manner, the retraction mechanism 20 can return the pressure receiving portion 16a and the pressing portion 16b, that is, the piston 16, by a predetermined retracting amount in accordance with the brake fluid pressure in the hydraulic pressure chamber 13a. Now, the advancing amount of the piston 16 relative to the brake fluid pressure in the hydraulic pressure chamber 13a of the cylinder portion 13 is described with reference to FIG. 5. When the advancing amount of the piston is increased along with the increase in brake fluid pressure as indicated by the solid line of FIG. 5, in a conventional disc brake device which does not include the retraction mechanism 20 according to the present invention, as indicated by the chain line of FIG. 5, the retracting amount (returning amount) of the piston due to the seal retraction is increased in the initial stage and exceeds the advancing amount of the piston. However, a relative movement occurs in the early stage between the piston seal deformed in the advancing direction of the piston and the advancing piston, and hence the retracting amount (returning amount) is not increased thereafter and falls below the advancing amount of the piston.

In contrast, in the disc brake device of this embodiment which includes the retraction mechanism 20, until the first elastic member 23 is elastically deformed up to the maximum elastic deformation amount (or until the distal end of the housing stepped portion 22a of the movable element 22 abuts against the second stepped portion 16a2), the movable element 22 can absorb the advancing amount of the piston 16 due to the reversing force imparted from the reversing member 21 (so-called stroke absorbing function). Therefore, as indicated by the broken line of FIG. 5, the retracting amount (returning amount) of the piston 16 which is retracted by the retraction mechanism 20 is continuously increased from the initial stage, and exceeds the advancing amount of the piston 16 in the entire range. Thus, in the entire hydraulic pressure range, the piston 16 is returned by a predetermined retracting amount depending on the brake fluid pressure. As a result, the drag phenomenon of the inner pad 17 and the outer pad 18 can be suppressed, and a stable brake feeling can be obtained.

Next, description is given of an operation of the retraction mechanism 20 for moving in association with the piston 16 and returning the piston 16 corresponding to the wear state of the inner pad 17 (and the outer pad 18). First, description is given of a case where the wear of the inner pad 17 (more specifically, wear of the friction material 17a) is significant. When the wear of the inner pad 17 is significant, distances (clearances) between the inner pad 17 and the disc rotor 11 and between the outer pad 18 and the disc rotor 11 become larger. In this case, in order to bring the inner pad 17 into press contact with the friction surface of the disc rotor 11, there is an increase in advancing amount of the piston 16, that is, the pressure receiving portion 16a and the pressing portion 16b, which advances in accordance with the brake fluid pressure in the hydraulic pressure chamber 13a of the cylinder portion 13.

Therefore, the retraction mechanism 20 advances in association with the advance of the pressure receiving portion 16a and the pressing portion 16b until the pressing portion 16b presses the inner pad 17 to bring the inner pad 17 into press contact with the friction surface of the disc rotor 11. That is, in this case, when the pressure receiving portion 16a causes the pressing portion 16b to advance toward the inner pad 17 in accordance with the brake fluid pressure, the pressing portion 16b does not stop until the pressing portion 16b brings the inner pad 17 into press contact with the friction surface of the disc rotor 11. Therefore, the pressure receiving portion 16a causes the pressing portion 16b to advance toward the inner pad 17 without compressing the reversing member 21 between the first stepped portion 16a1 and the inner peripheral surface of the pressing portion 16b. Thus, the reversing member 21 does not impart the reversing force to the movable element 22, and hence, when the pressure receiving portion 16a advances due to, for example, an advancing force which is larger than the frictional force generated by the second elastic member 24, the movable element 22 advances in association with the pressure receiving portion 16a while involving the elastic deformation of the first elastic member 23.

When the pressing portion 16b in this state starts pressing the inner pad 17 to bring the inner pad 17 into press contact with the friction surface of the disc rotor 11, as illustrated in FIG. 4, the first stepped portion 16a1 of the pressure receiving portion 16a starts entering the housing space along with the increase in brake fluid pressure in the hydraulic pressure chamber 13a, and as a result, the reversing member 21 is compressed and imparts the reversing force to the movable element 22. Accordingly, with respect to a new reference position which is set to the position advanced through the above-mentioned associative movement, the movable element 22 retreats relative to the advancing pressure receiving portion 16a due to the reversing force imparted from the reversing member 21 and the frictional force generated by the second elastic member 24 (in other words, is not shifted relative to the inner peripheral surface of the cylinder portion 13), and compresses the first elastic member 23 up to, for example, the maximum elastic deformation amount together with the second stepped portion 16a2 of the pressure receiving portion 16a. Then, the first elastic member 23 imparts a restoring force in accordance with the maximum elastic deformation amount to the movable element 22 and the second stepped portion 16a2.

When the brake fluid pressure in the hydraulic pressure chamber 13a is removed in this state, the reversing force is not imparted from the reversing member 21, but the shift of the movable element 22 from the above-mentioned new reference position is suppressed due to the frictional force that is generated by the second elastic member 24. As a result, the restoring force generated by the first elastic member 23 is imparted to the pressure receiving portion 16a via the second stepped portion 16a2 so that the pressure receiving portion 16a retreats. Further, the pressing portion 16b is coupled to the distal end portion of the pressure receiving portion 16a via the through hole 16b1 so as to be frictionally slidable along the distal end portion, and hence retreats integrally with the pressure receiving portion 16a. Accordingly, the pressure receiving portion 16a and the pressing portion 16b, that is, the piston 16, are returned by a retracting amount corresponding to the elastic deformation amount of the first elastic member 23. Accordingly, the inner pad 17 (and the outer pad 18) is returned to a position with a predetermined clearance from the disc rotor 11, with the result that the drag phenomenon of the inner pad 17 and the outer pad 18 can be suppressed, and a stable brake feeling can be obtained.

On the other hand, when the inner pad 17 (and the outer pad 18) thus worn out is, for example, replaced with a new inner pad 17 (and outer pad 18), the distance (clearance) between the inner pad 17 and the disc rotor 11 becomes smaller. In this case, in order to bring the inner pad 17 into press contact with the friction surface of the disc rotor 11, there is a decrease in advancing amount of the piston 16, that is, the pressure receiving portion 16a and the pressing portion 16b, which advances in accordance with the brake fluid pressure in the hydraulic pressure chamber 13a of the cylinder portion 13.

Therefore, when the pressure receiving portion 16a and the pressing portion 16b are forcibly retracted to the inner side of the cylinder portion 13 along with the replacement of the inner pad 17 (and the outer pad 18), the retraction mechanism 20 also moves to the inner side of the cylinder portion 13 in association with the retraction. Further, in the retraction mechanism 20, after the replacement of the inner pad 17 (and the outer pad 18), as described above, a new reference position is set to a position at which the reversing member 21 imparts the reversing force to the movable element 22 along with the advance of the pressure receiving portion 16a and the pressing portion 16b.

Accordingly, at the above-mentioned new reference position, the movable element 22 retreats relative to the advancing pressure receiving portion 16a due to the reversing force imparted from the reversing member 21 and the frictional force generated by the second elastic member 24 (in other words, is not shifted relative to the inner peripheral surface of the cylinder portion 13), and compresses the first elastic member 23 up to, for example, the maximum elastic deformation amount together with the second stepped portion 16a2 of the pressure receiving portion 16a. Then, the first elastic member 23 imparts a restoring force in accordance with the maximum elastic deformation amount to the second stepped portion 16a2.

Accordingly, the pressure receiving portion 16a and the pressing portion 16b, that is, the piston 16, are returned by a retracting amount corresponding to the elastic deformation amount of the first elastic member 23. Thus, the inner pad 17 (and the outer pad 18) is returned to a position with a predetermined clearance from the disc rotor 11, with the result that the drag phenomenon of the inner pad 17 and the outer pad 18 can be suppressed, and a stable brake feeling can be obtained.

As understood from the above description, according to the first embodiment described above, the retraction mechanism 20 for returning the piston 16 that has advanced for pressing the inner pad 17 may be provided on the piston 16 side. Further, the retraction mechanism 20 may include the reversing member 21 for reversing the advancing force (advancing stroke) of the piston 16 into the reversing force (retreating stroke) to be applied in the retreating direction of the piston 16, the movable element 22 which is relatively shifted in the retreating direction of the piston 16 with use of the reversing force generated by the reversing member 21 to elastically deform the first elastic member 23, and the second elastic member 24 for suppressing the shift of the retreated movable element 22.

Accordingly, the movable element 22 is retreated relative to the advancing piston 16 due to the reversing force (retreating stroke) generated by the reversing member 21 to elastically deform the first elastic member 23, with the result that the restoring force (elastic force) generated against the elastic deformation can be imparted to the advanced piston 16. Thus, the restoring force can be imparted constantly from the advancing position of the piston 16, and hence the piston 16 can be returned stably through elimination of unnecessary strokes of the movable element 22. Further, the restoring force can be imparted constantly from the advancing position of the piston 16, and hence, for example, there is no need to adjust the retracting amount for each vehicle, and the development cost can be reduced as well.

Further, the retraction mechanism 20 may be provided on the piston 16 side, and hence there is no need to perform processing separately on the cylinder portion 13 of the caliper 12. Thus, the conventionally used caliper 12 can be utilized, and the manufacturing cost can be reduced.

Further, the reversing force (retreating stroke) can be imparted to the movable element 22 through the deformation of the reversing member 21 along with the advance of the piston 16. Accordingly, the reversing force (retreating stroke) can be imparted reliably to the movable element 22 with a significantly simple structure, and the manufacturing cost can thus be reduced as well.

b. First Modification Example of First Embodiment

In the first embodiment described above, the present invention is carried out in the following manner. That is, the retraction mechanism 20 includes the sleeve-like movable element 22 which is shiftable along the outer peripheral surface of the coupling portion 16a3 of the pressure receiving portion 16a of the piston 16, and the movable element 22 retains the pressure receiving portion 16a inside the cylinder portion 13 and compresses the first elastic member 23 with use of the reversing force imparted from the reversing member 21 to elastically deform the first elastic member 23. In this case, the present invention may be carried out without the movable element 22. In the following, a first modification example of the first embodiment is described in detail, but the same components as those in the first embodiment described above are represented by the same reference symbols, and description thereof is therefore omitted herein.

Figure 6:
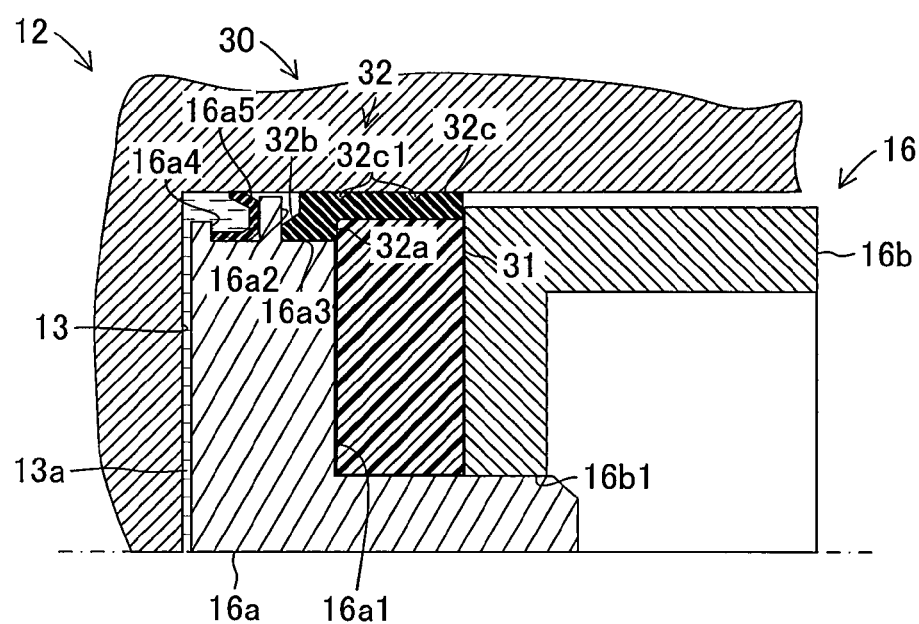
FIG. 6 is an enlarged schematic view for illustrating a retraction mechanism according to a first modification example of the first embodiment of the present invention.

In the first modification example, as illustrated in FIG. 6, the pressure receiving portion 16a of the piston 16 is formed into a stepped columnar shape, and includes the first stepped portion 16a1, the second stepped portion 16a2, and the coupling portion 16a3. The pressing portion 16b of the piston 16 is formed into a bottomed cylindrical shape having an opening on a side on which the inner pad 17 is to be pressed, and at a bottom surface portion thereof, the pressing portion 16b has the through hole 16b1 formed therein, which houses a cylindrical distal end portion of the pressure receiving portion 16a so that the pressing portion 16b is frictionally slidable along the distal end portion. Also in the first modification example, a retraction mechanism 30 is provided to the piston 16 formed of the pressure receiving portion 16a and the pressing portion 16b.

As illustrated in FIG. 6, the retraction mechanism 30 includes a disc-like reversing member 31 as the reversing means, which is arranged between the first stepped portion 16a1 formed in the pressure receiving portion 16a of the piston 16 and the bottom surface portion of the pressing portion 16b of the piston 16, and has a diameter larger than an outer diameter of the first stepped portion 16a1 and smaller than an outer diameter of the pressing portion 16b. The reversing member 31 is also made of a viscoelastic material (for example, rubber material which is small in hardness), and is molded into a predetermined thickness. Further, the retraction mechanism 30 includes an elastic member 32 which is formed to integrally have the reversing force transferring function of the movable element 22, the restoring force imparting function of the first elastic member 23, and the frictional force generating function (deformation maintaining function) of the second elastic member 24 in the retraction mechanism 20 according to the first embodiment described above.

The elastic member 32 is formed into a ring shape from, for example, an elastic material (for example, rubber material). Further, the elastic member 32 includes an annular stepped portion 32a, which comes into contact with the reversing member 31 on a side on which the reversing member 31 is to be compressed by the first stepped portion 16a1 and transfers a reversing force generated by the reversing member 31, an annular projecting portion 32b, which comes into contact with the second stepped portion 16a2 of the pressure receiving portion 16a and generates a restoring force, and a toric portion 32c, which comes into contact with an outer peripheral surface of the reversing member 31 and the inner peripheral surface of the cylinder portion 13 and generates a predetermined frictional force between the toric portion 32c and the inner peripheral surface of the cylinder portion 13. Note that, annular grooves 32c1 are formed in an outer peripheral surface of the toric portion 32c along a circumferential direction thereof to generate the frictional force stably.

Next, an operation of the retraction mechanism 30 according to the first modification example structured as described above is described. In the retraction mechanism 30, when the brake fluid is supplied to the cylinder portion 13 and the brake fluid pressure in the hydraulic pressure chamber 13a is increased, the pressure receiving portion 16a of the piston 16 advances toward the pressing portion 16b. When the pressing portion 16b presses the inner pad 17 to bring the inner pad 17 into press contact with the friction surface of the disc rotor 11, in accordance with the brake fluid pressure in the hydraulic pressure chamber 13a, the pressure receiving portion 16a compresses the reversing member 31 by the outer surface of the first stepped portion 16a1 and by an outer side of the bottom surface of the pressing portion 16b. In this case, as illustrated in FIG. 6, the reversing member 31 is housed in a housing space which is formed of the outer peripheral surface at the distal end portion of the pressure receiving portion 16a, the outer side of the bottom surface of the pressing portion 16b, the outer surface of the first stepped portion 16a1, and the annular stepped portion 32a and the toric portion 32c of the elastic member 32. Therefore, when the reversing member 31 is compressed in the housing space by the outer surface of the first stepped portion 16a1, due to a viscoelastic characteristic thereof, the reversing member 31 applies a reversing force to an inner surface of the annular stepped portion 32a so as to relatively shift the inner surface of the annular stepped portion 32a in the retreating direction opposite to the advancing direction of the pressure receiving portion 16a (piston 16).

More specifically, the reversing member 31 is housed in the housing space surrounded by the outer peripheral surface at the distal end portion of the pressure receiving portion 16a and the outer side of the bottom surface of the pressing portion 16b, which are formed as non-deformable members, further surrounded by the inner peripheral surface of the cylinder portion 13 through an intermediation of the toric portion 32c of the deformable elastic member 32, and further surrounded by the outer surface of the first stepped portion 16a1 of the pressure receiving portion 16a and the annular stepped portion 32a of the elastic member 32, which are shiftable in the advancing and retreating directions of the piston 16. Therefore, in order to relieve, from the housing space, the part of the reversing member 31 corresponding to a volume of the first stepped portion 16a1 of the pressure receiving portion 16a which enters the housing space, the reversing member 31 made of the viscoelastic material is deformed so as to push back the annular stepped portion 32a. That is, the reversing member 31 imparts the reversing force to the elastic member 32 by reversing the advancing force (brake fluid pressure) for advancing the pressure receiving portion 16a.

At this time, an area of contact of the annular stepped portion 32a with the reversing member 31 is set smaller than an area of contact of the first stepped portion 16a1 with the reversing member 31. Therefore, when the first stepped portion 16a1 enters the housing space, the reversing member 31 relatively shifts the elastic member 32 in the direction opposite to the advancing direction of the pressure receiving portion 16a (piston 16), that is, in the retreating direction of the pressure receiving portion 16a (piston 16), by the pushback amount (retreating stroke amount) larger than the entrance amount (advancing stroke amount) of the first stepped portion 16a1.

Figure 7:
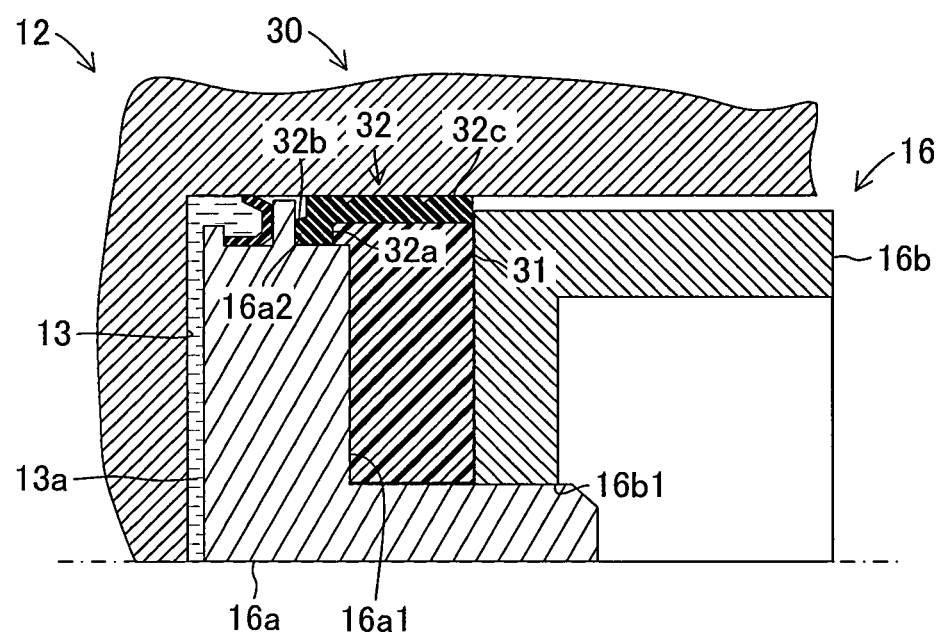
FIG. 7 is a view for illustrating that the retraction mechanism of FIG. 6 returns the piston when the advancing amount of the piston relative to the cylinder is small.

Further, in the retraction mechanism 30, the annular projecting portion 32b is formed between the reversing member 31 and the second stepped portion 16a2 of the pressure receiving portion 16a. Therefore, when the elastic member 32 subjected to the reversing force imparted from the reversing member 31 retreats relative to the advance of the pressure receiving portion 16a, as illustrated in FIG. 7, the annular projecting portion 32b is compressed and elastically deformed between the reversing member 31 and the second stepped portion 16a2. Accordingly, the annular projecting portion 32b can impart an elastic force (restoring force) in accordance with a relative shift amount between the elastic member 32 and the pressure receiving portion 16a, in other words, a compression amount, to the second stepped portion 16a2. In this case, the relative shift amount of the elastic member 32 to the pressure receiving portion 16a is restricted by the maximum elastic deformation amount of the annular projecting portion 32b. That is, the relative shift amount of the elastic member 32 to the pressure receiving portion 16a, which is restricted by the maximum elastic deformation amount of the annular projecting portion 32b, corresponds to the returning amount (retracting amount) for returning the pressure receiving portion 16a (piston 16).

Further, in the retraction mechanism 30, the toric portion 32c generates a predetermined frictional force between the toric portion 32c and the inner peripheral surface of the cylinder portion 13. In addition, the toric portion 32c generates a large frictional force also when the toric portion 32c is pressed against the inner peripheral surface of the cylinder portion 13 along with the compression and deformation of the reversing member 31. Therefore, even when the brake fluid pressure in the hydraulic pressure chamber 13a is decreased, the shift of the elastic member 32 relative to the inner peripheral surface of the cylinder portion 13 is suppressed due to the frictional force that is generated by the toric portion 32c, and the deformation of the annular projecting portion 32b is maintained. Accordingly, in a situation in which the annular projecting portion 32b is compressed and may therefore impart the restoring force, the restoring force generated by the annular projecting portion 32b is transferred to the pressure receiving portion 16a via the second stepped portion 16a2, and is applied as the returning force for retreating the piston 16 in the direction separating from the inner pad 17.

Further, when the pressure receiving portion 16a advances due to an advancing force which is larger than the frictional force generated by the toric portion 32c, the retraction mechanism 30 can be shifted in association with the pressure receiving portion 16a and the pressing portion 16b. Accordingly, the piston 16 can be returned appropriately in accordance with the wear of the inner pad 17 and the outer pad 18.

Accordingly, also in the first modification example, similarly to the first embodiment described above, the inner pad 17 (and the outer pad 18) can be returned to a position with a predetermined clearance from the disc rotor 11. Thus, the drag phenomenon of the inner pad 17 and the outer pad 18 can be suppressed, and a stable brake feeling can be obtained.

Further, in the first modification example, it is possible to employ the elastic member 32 which is formed to integrally have the reversing force transferring function, the restoring force imparting function, and the frictional force generating function (deformation maintaining function). Therefore, the structure can be simplified to achieve reduction in size and weight, and to enhance the assembly efficiency of the retraction mechanism 30.

c. Second Modification Example of First Embodiment

In the first embodiment described above, the present invention is carried out in the following manner. That is, the retraction mechanism 20 includes the movable element 22, and the movable element 22 compresses the first elastic member 23 between the movable element 22 and the first stepped portion 16a1 of the pressure receiving portion 16a of the piston 16 with use of the reversing force imparted from the reversing member 21. Then, the first elastic member 23 imparts the restoring force to the pressure receiving portion 16a. In this case, the present invention may be carried out in such a manner that the elastic force generated by the reversing member 21 that is made of the viscoelastic material is imparted to the pressure receiving portion 16a as the restoring force. In the following, a second modification example of the first embodiment is described in detail, but the same components as those in the first embodiment described above are represented by the same reference symbols, and description thereof is therefore omitted herein.

Figure 8:
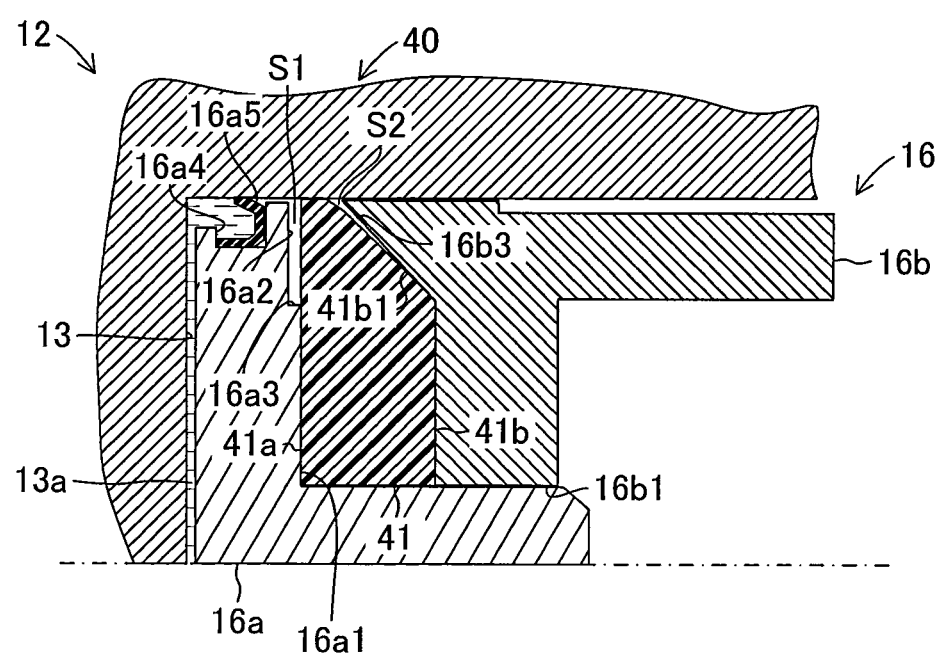
FIG. 8 is an enlarged schematic view for illustrating a retraction mechanism according to a second modification example of the first embodiment of the present invention.

In the second modification example, as illustrated in FIG. 8, the pressure receiving portion 16a of the piston 16 is formed into a stepped columnar shape, and includes the first stepped portion 16a1, the second stepped portion 16a2, and the coupling portion 16a3. The pressing portion 16b of the piston 16 is formed into a bottomed cylindrical shape having an opening on a side on which the inner pad 17 is to be pressed, and at a bottom surface portion thereof, the pressing portion 16b has the through hole 16b1 formed therein, which houses the cylindrical distal end portion of the pressure receiving portion 16a so that the pressing portion 16b is frictionally slidable along the distal end portion. Further, the bottom surface portion of the pressing portion 16b is formed into a pan shape provided with an inclined surface 16b3 in the vicinity of an outer periphery of an outer surface which is opposed to the pressure receiving portion 16a. Also in the first modification example, a retraction mechanism 40 is provided to the piston 16 formed of the pressure receiving portion 16a and the pressing portion 16b.

As illustrated in FIG. 8, the retraction mechanism 40 according to the second modification example includes a disc-like reversing member 41 as the reversing means, which is arranged between the first stepped portion 16a1 formed in the pressure receiving portion 16a of the piston 16 and the bottom surface portion of the pressing portion 16b that is formed into a pan shape, and has a diameter larger than the outer diameter of the first stepped portion 16a1 and substantially equal to the outer diameter of the pressing portion 16b. The reversing member 41 is also made of a viscoelastic material (for example, rubber material which is small in hardness), and is formed into a predetermined thickness. As illustrated in FIG. 8, a surface 41a of the reversing member 41, which is opposed to the first stepped portion 16a1 and the second stepped portion 16a2 of the pressure receiving portion 16a, is formed as a flat surface, and a surface 41b of the reversing member 41, which is opposed to the pressing portion 16b, includes an inclined surface 41b1 located on an outer peripheral side thereof corresponding to the inclined surface 16b3. Further, the reversing member 41 according to the second modification example exerts the reversing force generating function, the restoring force imparting function, and the frictional force generating function (deformation maintaining function) due to a viscoelastic characteristic thereof.

Specifically, as illustrated in FIG. 8, the retraction mechanism 40, that is, the reversing member 41 according to the second modification example is housed in a housing space which is formed of the outer peripheral surface at the distal end portion of the pressure receiving portion 16a, an outer side of the bottom surface of the pressing portion 16b that is formed into a pan shape, the outer surface of the first stepped portion 16a1, the outer surface of the second stepped portion 16a2, and the inner peripheral surface of the cylinder portion 13. Further, in the second modification example, a space S1 is formed between the surface 41a of the reversing member 41 and the second stepped portion 16a2 of the pressure receiving portion 16a, and a space S2 is formed between the inclined surface 41b1 of the surface 41b of the reversing member 41 and the inclined surface 16b2 of the pressing portion 16b. In this case, the space S1 is set larger than the space S2.

Figure 9:
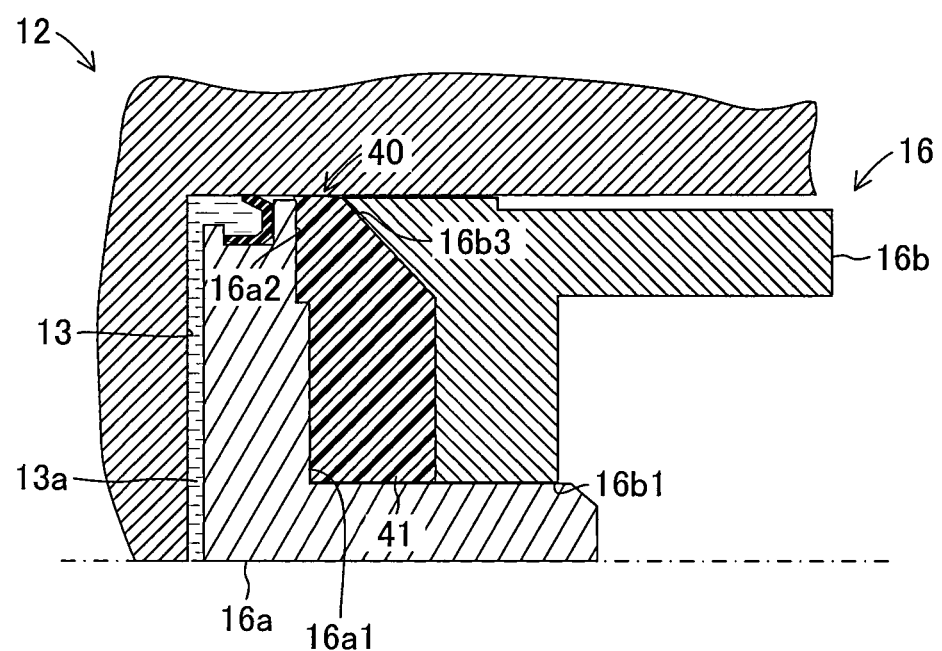
FIG. 9 is a view for illustrating that the retraction mechanism of FIG. 8 returns the piston when the advancing amount of the piston relative to the cylinder is small.

Therefore, when the brake fluid is supplied to the cylinder portion 13 and the brake fluid pressure in the hydraulic pressure chamber 13a is increased, the pressure receiving portion 16a of the piston 16 advances toward the pressing portion 16b. When the pressing portion 16b presses the inner pad 17 to bring the inner pad 17 into press contact with the friction surface of the disc rotor 11, the pressure receiving portion 16a compresses the reversing member 41 by the outer surface of the first stepped portion 16a1 and by the outer side of the bottom surface of the pressing portion 16b. Accordingly, as illustrated in FIG. 9, the reversing member 41 made of the viscoelastic material is deformed toward the space S1 and the space S2 formed in the housing space, and generates a reversing force to be applied to the second stepped portion 16a2 of the pressure receiving portion 16a in the retreating direction opposite to the advancing direction of the pressure receiving portion 16a (piston 16).

More specifically, the reversing member 41 is housed in the housing space surrounded by the outer peripheral surface at the distal end portion of the pressure receiving portion 16a, the outer side of the bottom surface of the pressing portion 16b, and the inner peripheral surface of the cylinder portion 13, which are formed as non-deformable members, and further surrounded by the outer surfaces of the first stepped portion 16a1 and the second stepped portion 16a2 of the pressure receiving portion 16a, which are shiftable in the advancing and retreating directions of the piston 16. Therefore, in order to relieve, from the housing space, the part of the reversing member 41 corresponding to a volume of the first stepped portion 16a1 of the pressure receiving portion 16a which enters the housing space, the reversing member 41 made of the viscoelastic material is deformed toward the space S1 and the space S2 formed in the housing space. At this time, the space S1 is set larger than the space S2, and hence an amount of deformation of the reversing member 41 toward the space S1 becomes larger.

Further, the reversing member 41 is made of the viscoelastic material, and hence the brake fluid pressure (pressure) transferred via the first stepped portion 16a1 of the pressure receiving portion 16a is applied perpendicularly to each contact surface. Therefore, in particular, the pressure is applied in a direction identical with the retreating direction of the pressure receiving portion 16a at a position between the surface 41a of the reversing member 41 and the second stepped portion 16a2 of the pressure receiving portion 16a, and the pressure is applied in a direction perpendicular to the inclined surface 16b3 at a position between the inclined surface 41b1 of the reversing member 41 and the inclined surface 16b3 of the pressing portion 16b. In other words, the pressure is applied so that a pressure component in the advancing direction of the pressing portion 16b is reduced.

Thus, when the first stepped portion 16a1 enters the housing space, the reversing member 41 can efficiently impart the advancing force (brake fluid pressure) to the second stepped portion 16a2 as the reversing force. Further, as illustrated in FIG. 9, when the pressure receiving portion 16a advances relatively, the reversing member 41 is primarily deformed toward the large space S1, and hence the reversing member 41 can impart the elastic force (restoring force) between the reversing member 41 and the second stepped portion 16a2.

Further, the outer peripheral surface of the retraction mechanism 40, that is, the reversing member 41, comes into contact with the inner peripheral surface of the cylinder portion 13. Therefore, when the first stepped portion 16a1 enters the housing space, there is an increase in pressing force of the reversing member 41 for pressing the inner peripheral surface of the cylinder portion 13 along with the compression of the reversing member 41. Accordingly, the reversing member 41 can generate a large frictional force between the reversing member 41 and the inner peripheral surface of the cylinder portion 13.

In this manner, the reversing member 41 having the reversing force generating function, the restoring force imparting function, and the frictional force generating function (deformation maintaining function) transfers the restoring force, which is generated against the relative advance of the pressure receiving portion 16a, to the second stepped portion 16a2 with use of the generated reversing force and frictional force by the time when the brake fluid pressure in the hydraulic pressure chamber 13a is decreased and the reversing member 41 is restored to the initial shape. Accordingly, the reversing member 41 can apply the restoring force as the returning force for retreating the piston 16 in the direction separating from the inner pad 17.

Further, when the pressure receiving portion 16a advances due to an advancing force which is larger than the frictional force generated between the retraction mechanism 40, that is, the reversing member 41, and the inner peripheral surface of the cylinder portion 13, the reversing member 41 can be shifted in association with the pressure receiving portion 16a and the pressing portion 16b. Accordingly, the piston 16 can be returned appropriately in accordance with the wear of the inner pad 17 and the outer pad 18.

Accordingly, also in the second modification example, similarly to the first embodiment described above, the inner pad 17 (and the outer pad 18) can be returned to a position with a predetermined clearance from the disc rotor 11. Thus, the drag phenomenon of the inner pad 17 and the outer pad 18 can be suppressed, and a stable brake feeling can be obtained.

Further, in the second modification example, it is possible to employ the reversing member 41 having the reversing force generating function, the restoring force imparting function, and the frictional force generating function (deformation maintaining function). Therefore, the structure can be simplified to achieve reduction in size and weight, and to enhance the assembly efficiency of the retraction mechanism 40.

d. Third Modification Example of First Embodiment

In the first embodiment described above, the present invention is carried out in the following manner. That is, in the retraction mechanism 20, the reversing member 21 made of the viscoelastic material is employed, and the reversing member 21 imparts, to the movable element 22, the reversing force which is generated through the compression by the first stepped portion 16a1 of the pressure receiving portion 16a. In this case, the present invention may be carried out in such a manner that, instead of employing the reversing member 21 made of the viscoelastic material, the advancing stroke of the advancing pressure receiving portion 16a is mechanically reversed and the retreating stroke (that is, reversing force) is imparted to the movable element 22. In the following, a third modification example of the first embodiment is described in detail, but the same components as those in the first embodiment described above are represented by the same reference symbols, and description thereof is therefore omitted herein.

Figure 10:
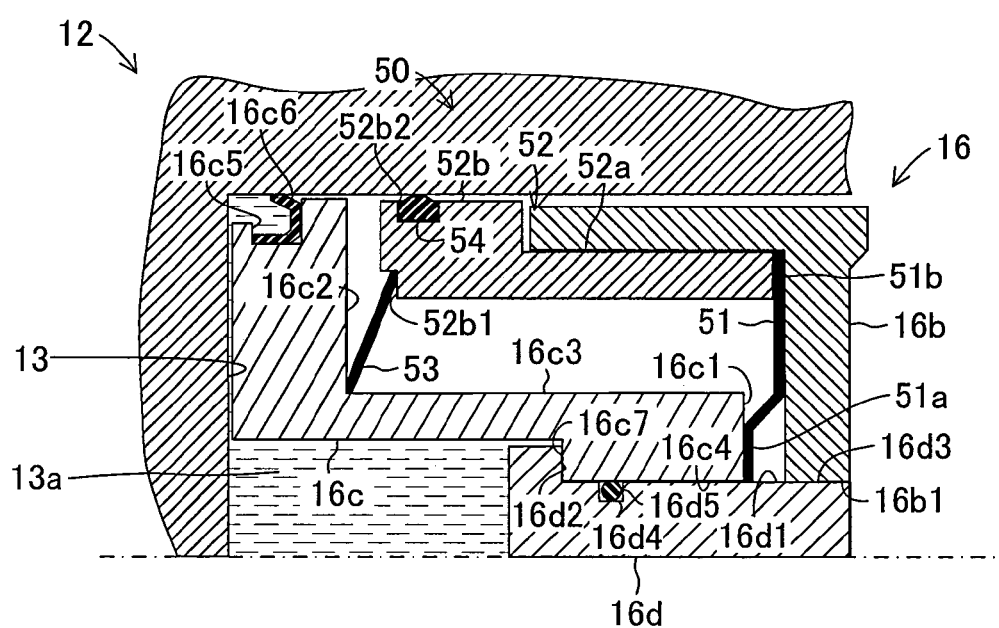
FIG. 10 is an enlarged schematic view for illustrating a retraction mechanism according to a third modification example of the first embodiment of the present invention.

In the third modification example, as illustrated in FIG. 10, the pressure receiving portion 16a and the pressing portion 16b forming the piston 16 are slightly changed. Specifically, as illustrated in FIG. 10, the pressure receiving portion according to the third modification example is divided into two components, that is, a first pressure receiving portion 16c which is formed into a cylindrical shape, and a second pressure receiving portion 16d which is formed into a solid columnar shape. The first pressure receiving portion 16c includes a distal end portion 16c1, a stepped portion 16c2, and a coupling portion 16c3 for coupling the distal end portion 16c1 and the stepped portion 16c2 to each other. The distal end portion 16c1 has a through hole 16c4 formed therein, through which the second pressure receiving portion 16d is inserted. Further, an annular seal groove 16c5 is formed in an outer peripheral surface of the stepped portion 16c2. The seal groove 16c5 houses a seal member (for example, lip packing) 16c6 for preventing leakage of the brake fluid at a position between the seal member 16c6 and the inner peripheral surface of the cylinder portion 13.

The second pressure receiving portion 16d includes a main portion 16d1 which is fitted to the through hole 16c4 of the first pressure receiving portion 16c, a stepped portion 16d2 which is large in diameter and is formed on the hydraulic pressure chamber 13a side, and a firm-fixing portion 16d3 which is fastened with, for example, a screw into the through hole 16b1 of the pressing portion 16b. An annular seal groove 16d4 is formed in an outer peripheral surface of the main portion 16d1, and the seal groove 16d4 houses a seal member (for example, O-ring) 16d5 for preventing leakage of the brake fluid at a position between the seal member 16d5 and an inner peripheral surface of the through hole 16c4 of the first pressure receiving portion 16c. Further, the stepped portion 16d2 is engageable with an engagement stepped portion 16c7 which is formed on an inner side of the first pressure receiving portion 16c.

In the piston 16 according to the third modification example thus formed of the first pressure receiving portion 16c, the second pressure receiving portion 16d, and the pressing portion 16b, the first pressure receiving portion 16c and the second pressure receiving portion 16d engage with each other through the use of the engagement stepped portion 16c7 and the stepped portion 16d2, and the firm-fixing portion 16d3 of the second pressure receiving portion 16d is integrally and firmly fixed to the pressing portion 16b. Therefore, when the brake fluid pressure in the hydraulic pressure chamber 13a is increased, the piston 16 moves in a direction of pressing the inner pad 17 integrally. Also in the third modification example, a retraction mechanism 50 is provided to the piston 16.

As illustrated in FIG. 10, the retraction mechanism 50 according to the third modification includes a reversing member 51 which is changed from the reversing member 21 according to the first embodiment described above, and a belleville spring 53 instead of the first elastic member 23 according to the first embodiment described above. Note that, in the third modification example, a movable element 52 is formed similarly to the movable element 22 according to the first embodiment described above, and a second elastic member 54 is formed similarly to the second elastic member 24 according to the first embodiment described above.

Figure 11:
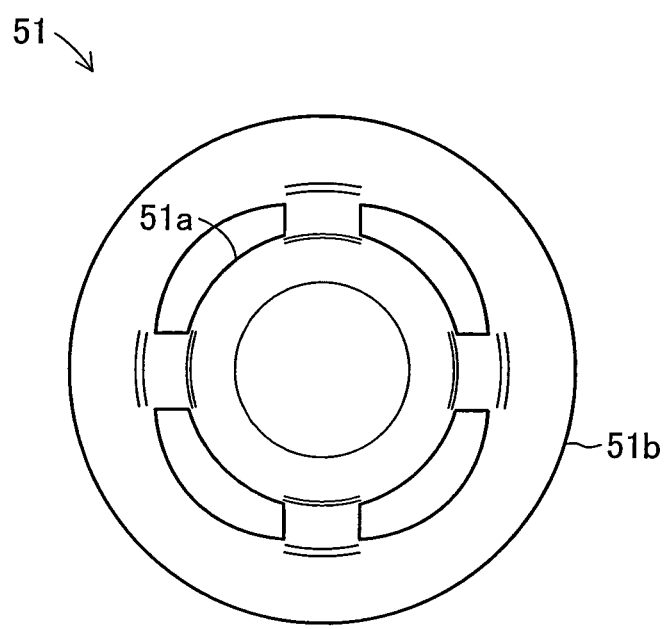
FIG. 11 is a schematic view for illustrating a reversing member which forms the retraction mechanism of FIG. 10.

The reversing member 51 is formed into a disc shape from, for example, a metal material, and is deformed in a snapping manner to reverse an advancing stroke (advancing force generated from the brake fluid pressure) of the first pressure receiving portion 16c into a retreating stroke (reversing force) of the movable element 52. Therefore, as illustrated in FIGS. 10 and 11, the reversing member 51 includes a projecting portion 51a which abuts against the distal end portion 16c1 of the first pressure receiving portion 16c and is depressed due to the advancing stroke (advancing force) of the distal end portion 16c1, and a flat portion 51b which lifts the movable element 52 in the retreating direction through the depression of the projecting portion 51a. In this case, as illustrated in FIG. 11, a diameter of the flat portion 51b is set larger by a predetermined amount than a diameter of the projecting portion 51a. The belleville spring 53 is assembled between the movable element 52 and the first pressure receiving portion 16c, and an outer peripheral side thereof is housed in a housing stepped portion 52b1 formed in the movable element 52, whereas an inner peripheral side thereof abuts against the stepped portion 16c2 of the first pressure receiving portion 16c.

Figure 12:
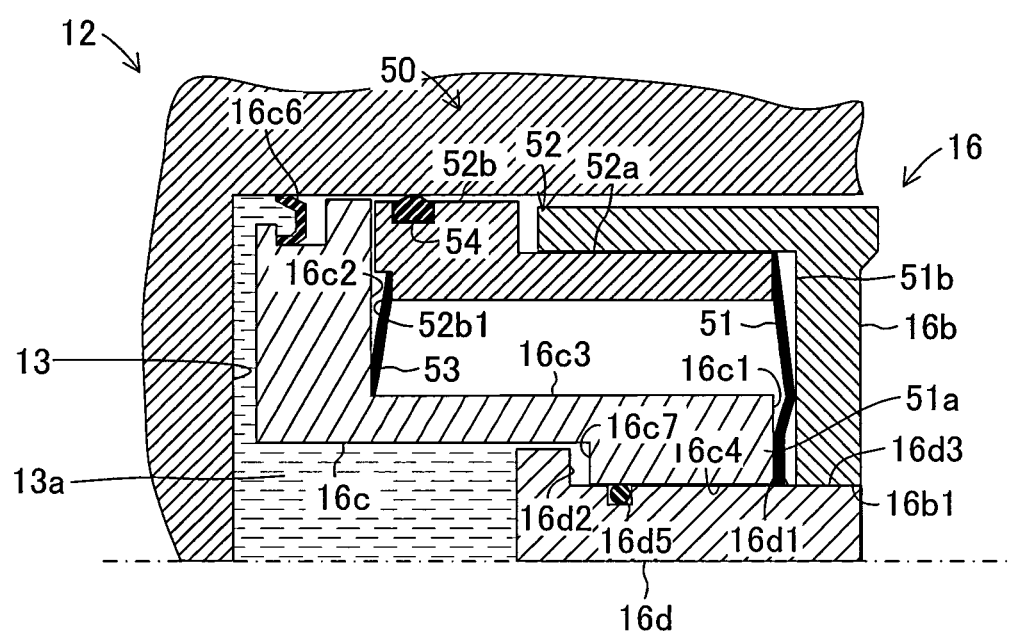
FIG. 12 is a view for illustrating that the retraction mechanism of FIG. 10 returns the piston when the advancing amount of the piston relative to the cylinder is small.

Next, an operation of the retraction mechanism 50 according to the third modification example structured as described above is described. In the third modification example, when the brake fluid is supplied to the cylinder portion 13 and the brake fluid pressure in the hydraulic pressure chamber 13a is increased, the pressure receiving portion 16c, the second pressure receiving portion 16d, and the pressing portion 16b of the piston 16 integrally advance inside the cylinder portion 13 toward the inner pad 17. When the pressing portion 16b presses the inner pad 17 to bring the inner pad 17 into press contact with the friction surface of the disc rotor 11, the second pressure receiving portion 16d and the pressing portion 16b stop their advance. On the other hand, the first pressure receiving portion 16c advances due to the brake fluid pressure in the hydraulic pressure chamber 13a. Accordingly, as illustrated in FIG. 12, in the reversing member 51 of the retraction mechanism 50, due to the snapping deformation thereof, the projecting portion 51a is pressed by the distal end portion 16c1 of the first pressure receiving portion 16c and is depressed accordingly.

In this case, in the reversing member 51, the projecting portion 51a is depressed so that the flat portion 51b is lifted in a snapping manner. That is, the reversing member 51 reverses the advancing stroke (or the advancing force generated from the brake fluid pressure) of the first pressure receiving portion 16c into the retreating stroke (or the reversing force) of the movable element 52 on the principle of leverage in which the projecting portion 51a is a power point, the coupling position between the projecting portion 51a and the flat portion 51b is a fulcrum, and the flat portion 51b is a point of application.

At this time, the diameter of the flat portion 51b of the reversing member 51 is set larger than the diameter of the projecting portion 51a of the reversing member 51. In other words, a distance between the point of application and the fulcrum is larger than a distance between the power point and the fulcrum. Therefore, the reversing member 51 imparts, to the movable element 52, a retreating stroke larger than the advancing stroke which is transferred through the depression of the projecting portion 51a by the distal end portion 16c1 of the first pressure receiving portion 16c.

Further, in the retraction mechanism 50, the belleville spring 53 is arranged between the housing stepped portion 52b1 of the movable element 52 and the stepped portion 16c2 of the first pressure receiving portion 16c. Therefore, when the movable element 52 subjected to the retreating stroke (reversing force) imparted from the reversing member 51 retreats relative to the advance of the first pressure receiving portion 16c, the belleville spring 53 is compressed and elastically deformed between the movable element 52 and the stepped portion 16c2. That is, the movable element 52 exerts the reversing force transferring function of transferring the retreating stroke (reversing force) from the reversing member 51 to the belleville spring 53.

Accordingly, the belleville spring 53 can impart an elastic force (restoring force) in accordance with a relative shift amount between the movable element 52 and the first pressure receiving portion 16c, in other words, a compression amount, to the movable element 52 and the stepped portion 16c2. Thus, the belleville spring 53 exerts the restoring force imparting function. In this case, the relative shift amount of the movable element 22 to the first pressure receiving portion 16c is restricted due to abutment between the movable element 52 and the stepped portion 16c2. That is, a clearance set between the movable element 52 and the stepped portion 16c2 corresponds to a returning amount (retracting amount) for returning the first pressure receiving portion 16c (piston 16).

Further, in the retraction mechanism 50, the second elastic member 54 generates a predetermined frictional force between the second elastic member 54 and the inner peripheral surface of the cylinder portion 13. Therefore, when the brake fluid pressure in the hydraulic pressure chamber 13a is decreased and the retreating stroke (reversing force) is not imparted to the movable element 52, the shift of the movable element 52 relative to the inner peripheral surface of the cylinder portion 13 is suppressed due to the frictional force that is generated by the second elastic member 54, and the deformation of the belleville spring 53 is maintained. That is, the second elastic member 54 exerts the frictional force generating function (deformation maintaining function). Accordingly, in a situation in which the belleville spring 53 is compressed and may therefore impart the restoring force, the restoring force generated by the belleville spring 53 is transferred to the first pressure receiving portion 16c via the stepped portion 16c2, and is applied as the returning force for retreating the piston 16 in the direction separating from the inner pad 17. Accordingly, when the first pressure receiving portion 16c retreats due to the imparted restoring force, the engagement stepped portion 16c7 of the first pressure receiving portion 16c and the stepped portion 16d2 of the second pressure receiving portion 16d engage with each other, and as a result, the second pressure receiving portion 16d and the pressing portion 16b can retreat integrally with each other.

Further, when the first pressure receiving portion 16c, the second pressure receiving portion 16d, and the pressing portion 16b advance due to an advancing force which is larger than the frictional force generated by the second elastic member 54, the retraction mechanism 50 can be shifted in association with the piston 16. Accordingly, the piston 16 can be returned appropriately in accordance with the wear of the inner pad 17 and the outer pad 18.

Accordingly, also in the third modification example, similarly to the first embodiment described above, the inner pad 17 (and the outer pad 18) can be returned to a position with a predetermined clearance from the disc rotor 11. Thus, the drag phenomenon of the inner pad 17 and the outer pad 18 can be suppressed, and a stable brake feeling can be obtained.

e. Second Embodiment

In the first embodiment and its modification examples described above, the present invention is carried out in the following manner. That is, the reversing members 21, 31, 41, and 51 generate the reversing force (or the retreating stroke) along with the advance of the pressure receiving portion 16a and the first pressure receiving portion 16c, to thereby generate the restoring force for returning the piston 16 with use of the reversing force (or the retreating stroke). The present invention may be carried out in such a manner that, instead of generating the reversing force (or the retreating stroke) through use of the reversing members 21, 31, 41, and 51 as described above, the brake fluid pressure in the hydraulic pressure chamber 13a is directly used for generating the reversing force (or the retreating stroke). In the following, a second embodiment of the present invention is described in detail, but the same components as those in the first embodiment described above are represented by the same reference symbols, and description thereof is therefore omitted herein.

Figure 13:
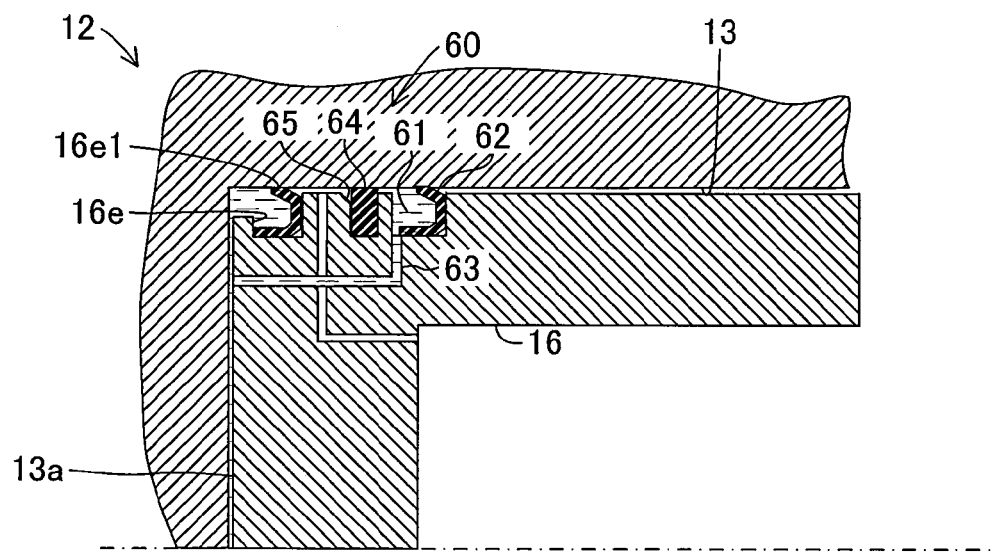
FIG. 13 is an enlarged schematic view for illustrating a retraction mechanism according to a second embodiment of the present invention.

In the second embodiment, as illustrated in FIG. 13, the piston 16 is formed into a bottomed cylindrical shape having an opening toward the inner pad 17. Note that, the piston 16 has an air communication passage formed therein, which communicates an internal space to external air. Further, as illustrated in FIG. 13, an annular seal groove 16e is formed in an outer peripheral surface of the piston 16. The seal groove 16e houses a seal member (for example, lip packing) 16e1 for preventing leakage of the brake fluid at a position between the seal member 16e1 and the inner peripheral surface of the cylinder portion 13. Accordingly, the hydraulic pressure chamber 13a filled with the brake fluid which is adjusted in pressure is defined in the cylinder portion 13. Further, a retraction mechanism 60 according to the second embodiment is provided to the piston 16 on the inner pad 17 side with respect to the seal groove 16e.

The retraction mechanism 60 is described specifically. As illustrated in FIG. 13, the retraction mechanism 60 includes an annular reversing hydraulic pressure chamber 61, which is formed in the outer peripheral surface of the piston 16, a seal member (for example, lip packing) 62, which is housed in the reversing hydraulic pressure chamber 61, for preventing leakage of the brake fluid at a position between the seal member 62 and the inner peripheral surface of the cylinder portion 13, and a communication passage 63, which communicates the reversing hydraulic pressure chamber 61 to the hydraulic pressure chamber 13a. Further, the retraction mechanism 60 has a housing groove 65 formed in the outer peripheral surface of the piston 16 at a position between the reversing hydraulic pressure chamber 61 and the seal groove 16e. The housing groove 65 houses a returning member 64.

The returning member 64 is molded into a ring shape having a substantially rectangular cross section from an elastic material (for example, rubber material), and is housed in the housing groove 65 due to a predetermined pressing force, in other words, a predetermined compressing force, between the inner peripheral surface of the cylinder portion 13 and the outer peripheral surface of the piston 16. Further, when the piston 16 advances relative to the inner peripheral surface of the cylinder portion 13, the returning member 64 is elastically deformed to generate a restoring force for retreating the piston 16. Further, the returning member 64 is housed in the housing groove 65 due to the predetermined compressing force, and accordingly the returning member 64 also exerts a sealing function of preventing leakage of the brake fluid supplied to the reversing hydraulic pressure chamber 61 at a position between the returning member 64 and the inner peripheral surface of the cylinder portion 13.

An end surface of the housing groove 65 which is opposed to the inner peripheral surface of the cylinder portion 13 is chamfered on the seal groove 16e side, that is, on a side on which the piston 16 retreats. Accordingly, the returning member 64 is easily deformed in the retreating direction along with the advance of the piston 16, and is not easily deformed in the advancing direction along with the retreat of the piston 16.

Thus, in the retraction mechanism 60 according to the second embodiment, the reversing hydraulic pressure chamber 61, the seal member 62, and the communication passage 63 exert the reversing force generating function, and the returning member 64 and the housing groove 65 exert the restoring force imparting function and the frictional force generating function (deformation maintaining function).

Next, a basic operation of the retraction mechanism 60 according to the second embodiment structured as described above is described. When the brake fluid is supplied to the cylinder portion 13 and the brake fluid pressure in the hydraulic pressure chamber 13a is increased, the piston 16 advances toward the inner pad 17. On the other hand, in the retraction mechanism 60, along with the increase in brake fluid pressure in the hydraulic pressure chamber 13a of the cylinder portion 13, the brake fluid pressure is supplied through the communication passage 63, and the brake fluid pressure in the reversing hydraulic pressure chamber 61 that is sealed with the seal member 62 is increased. Accordingly, the brake fluid pressure in the reversing hydraulic pressure chamber 61 is applied to the returning member 64 as a reversing force for relatively shifting the returning member 64 in the retreating direction opposite to the advancing direction of the piston 16. That is, when the brake fluid pressure is supplied to the reversing hydraulic pressure chamber 61 that is sealed with the seal member 62, the reversing hydraulic pressure chamber 61 and the seal member 62 generate the reversing force to be imparted to the returning member 64 by reversing the brake fluid pressure for advancing the piston 16.

Figure 14:
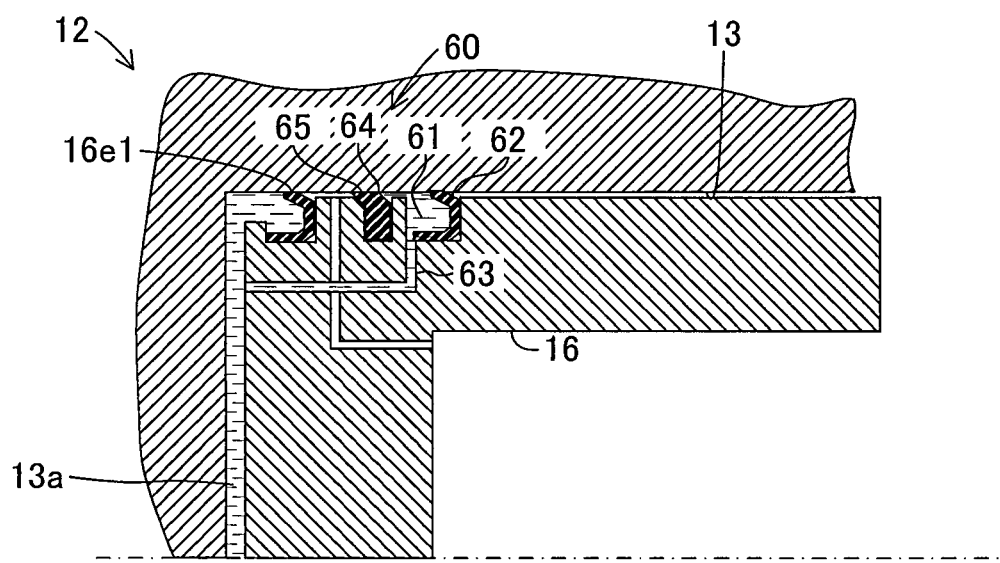
FIG. 14 is a view for illustrating that the retraction mechanism of FIG. 13 returns the piston when the advancing amount of the piston relative to the cylinder is small.

Further, in the retraction mechanism 60, the returning member 64 is retained in the housing groove 65 so as to be easily deformed in the retreating direction along with the advance of the piston 16. Therefore, when the reversing force is imparted along with the advance of the piston 16 to the returning member 64 from the reversing hydraulic pressure chamber 61 that is sealed with the seal member 62, as illustrated in FIG. 14, a distal end part of the returning member 64, which comes into contact with the inner peripheral surface of the cylinder portion 13, retreats relative to the advance of the piston 16 and is elastically deformed accordingly.

Accordingly, the returning member 64 can impart a shear force (restoring force) in accordance with a relative shift amount between the inner peripheral surface of the cylinder portion 13 and the outer peripheral surface of the piston 16, in other words, an elastic deformation amount, to the cylinder portion 13 and the piston 16. Thus, the returning member 64 exerts the restoring force imparting function. In this case, the maximum elastic deformation amount of the returning member 64 is restricted by a size of chamfer formed in the housing groove 65. That is, the elastic deformation amount of the returning member 64, which is restricted by the size of chamfer formed in the housing groove 65, corresponds to the returning amount (retracting amount) for returning the piston 16.

Further, in the retraction mechanism 60, the returning member 64 is housed in the housing groove 65, and generates a predetermined frictional force between the returning member 64 and the inner peripheral surface of the cylinder portion 13. That is, the returning member 64 also exerts the frictional force generating function (deformation maintaining function). Therefore, when the brake fluid pressure in the reversing hydraulic pressure chamber 61 is decreased and the reversing force is not imparted, the elastic deformation of the returning member 64 is maintained due to the frictional force that is generated between the returning member 64 and the inner peripheral surface of the cylinder portion 13. Therefore, the restoring force generated by the returning member 64 is transferred to the piston 16 via the housing groove 65, and is applied as the returning force for retreating the piston 16 in the direction separating from the inner pad 17.

By the way, also in the second embodiment, in response to the advance and retreat of the piston 16, the retraction mechanism 60 provided to the piston 16 moves in association with the piston 16 and returns the piston 16 corresponding to the magnitude of the brake fluid pressure in the hydraulic pressure chamber 13a (that is, the reversing hydraulic pressure chamber 61) and the wear state of the inner pad 17 (and the outer pad 18). In the following, the operation of the retraction mechanism 60 is described in detail.

First, description is given of a case where the brake fluid pressure in the hydraulic pressure chamber 13a, that is, the reversing hydraulic pressure chamber 61, is low at the time of pressurization. In this case, as illustrated in FIG. 14, the reversing force is imparted to the returning member 64 in response to the increase in brake fluid pressure in the reversing hydraulic pressure chamber 61.

The returning member 64 retreats relative to the advancing piston 16 due to the reversing force imparted from the reversing hydraulic pressure chamber 61 and the frictional force generated between the returning member 64 and the inner peripheral surface of the cylinder portion 13, and is elastically deformed accordingly. At this time, the brake fluid pressure in the reversing hydraulic pressure chamber 61 is low, and hence the returning member 64 is elastically deformed by an elastic deformation amount that is smaller than the maximum elastic deformation amount, and imparts a restoring force (shear force) in accordance with this elastic deformation amount to the inner peripheral surface of the cylinder portion 13 and the piston 16.

When the brake fluid pressure in the hydraulic pressure chamber 13a is removed in this state, the brake fluid pressure in the reversing hydraulic pressure chamber 61 is also removed so that the reversing force is not imparted, but the elastic deformation of the returning member 64 is maintained due to the frictional force that is generated between the returning member 64 and the inner peripheral surface of the cylinder portion 13. As a result, the restoring force generated by the returning member 64 is imparted to the piston 16 via the housing groove 65, and accordingly the piston 16 is returned by a retracting amount corresponding to the elastic deformation amount of the returning member 64. Note that, in this case, the brake fluid pressure in the hydraulic pressure chamber 13a is low, and hence the returning member 64 is elastically deformed by the elastic deformation amount that is smaller than the maximum elastic deformation amount.

Next, when the brake fluid pressure in the reversing hydraulic pressure chamber 61 is high at the time of pressurization, as illustrated in FIG. 14, the returning member 64 is elastically deformed up to the maximum elastic deformation amount. When the brake fluid pressure in the reversing hydraulic pressure chamber 61 is removed in this state, due to the restoring force generated by the returning member 64, the piston 16 is returned by a retracting amount corresponding to the maximum elastic deformation amount of the returning member 64.

Figure 15:
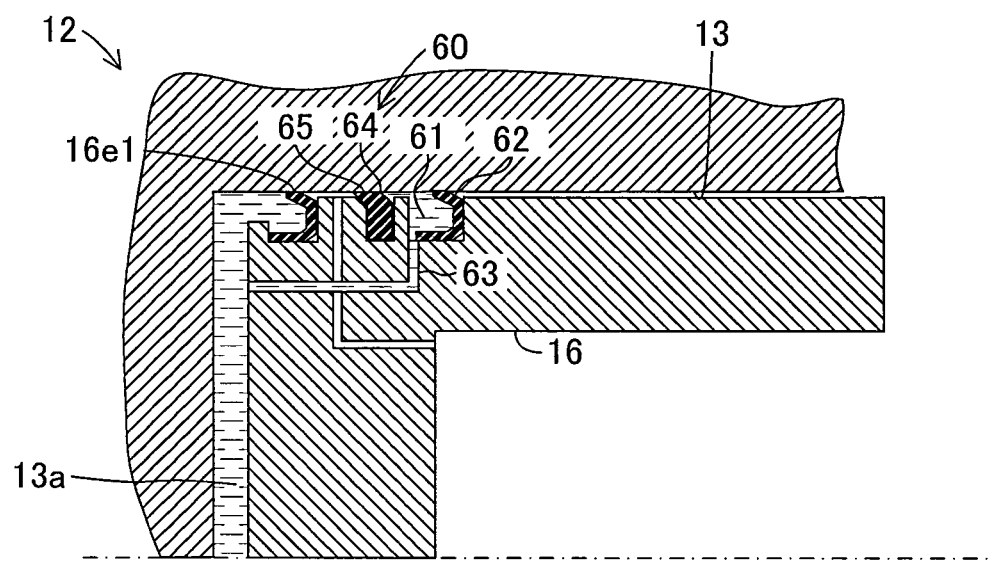
FIG. 15 is a view for illustrating that the retraction mechanism of FIG. 13 returns the piston when the advancing amount of the piston relative to the cylinder is large.

Further, when the brake fluid pressure in the reversing hydraulic pressure chamber 61 is excessively high at the time of pressurization, as described above, the advancing amount of the piston 16 is increased to a higher extent than in a predetermined setting. In this case, in a situation in which the returning member 64 is elastically deformed up to the maximum elastic deformation amount, the returning member 64 cannot further be elastically deformed. Thus, in this case, as illustrated in FIG. 15, the returning member 64 advances together with the piston 16 against the frictional force that is generated between the returning member 64 and the inner peripheral surface of the cylinder portion 13. However, when the brake fluid pressure in the reversing hydraulic pressure chamber 61 is removed in this state, due to the restoring force generated by the returning member 64 thus elastically deformed, the piston 16 is returned by a retracting amount corresponding to the maximum elastic deformation amount of the returning member 64.

Next, description is given of an operation of the retraction mechanism 60 for moving in association with the piston 16 and returning the piston 16 corresponding to the wear state of the inner pad 17 (and the outer pad 18). First, description is given of a case where the wear of the inner pad 17 (more specifically, wear of the friction material 17a) is significant. When the wear of the inner pad 17 is significant, as described above, there is an increase in advancing amount of the piston 16, which advances in accordance with the brake fluid pressure in the hydraulic pressure chamber 13a of the cylinder portion 13.

Therefore, as illustrated in FIG. 15, the retraction mechanism 60 advances in association with the advance of the piston 16 against the reversing force imparted from the reversing hydraulic pressure chamber 61 and the frictional force generated by the returning member 64 until the piston 16 presses the inner pad 17 to bring the inner pad 17 into press contact with the friction surface of the disc rotor 11. That is, in this case, when the piston 16 advances toward the inner pad 17 in accordance with the brake fluid pressure in the hydraulic pressure chamber 13a, the piston 16 does not stop until the piston 16 brings the inner pad 17 into press contact with the friction surface of the disc rotor 11.

When the piston 16 in this state starts pressing the inner pad 17 to bring the inner pad 17 into press contact with the friction surface of the disc rotor 11, with respect to a new reference position which is set to the position advanced through the above-mentioned associative movement, the returning member 64 of the retraction mechanism 60 imparts a restoring force in accordance with, for example, the maximum elastic deformation amount to the inner peripheral surface of the cylinder portion 13 and the piston 16. When the brake fluid pressure in the reversing hydraulic pressure chamber 61 is removed, the reversing force is not imparted from the reversing hydraulic pressure chamber 61, but the elastic deformation of the returning member 64 is maintained due to the frictional force that is generated between the returning member 64 and the inner peripheral surface of the cylinder portion 13. As a result, the returning member 64 imparts the restoring force to the piston 16 from the above-mentioned new reference position, and the piston 16 is returned by a retracting amount corresponding to the elastic deformation amount of the first elastic member 23.

Accordingly, the inner pad 17 (and the outer pad 18) is returned to a position with a predetermined clearance from the disc rotor 11. Thus, the drag phenomenon of the inner pad 17 and the outer pad 18 can be suppressed, and a stable brake feeling can be obtained.

On the other hand, when the inner pad 17 (and the outer pad 18) thus worn out is replaced with a new inner pad 17 (and outer pad 18), as described above, there is a decrease in advancing amount of the piston 16, which advances in accordance with the brake fluid pressure in the hydraulic pressure chamber 13a of the cylinder portion 13.

Therefore, when the piston 16 is forcibly retracted to the inner side of the cylinder portion 13 along with the replacement of the inner pad 17 (and the outer pad 18), the retraction mechanism 60 also moves to the inner side of the cylinder portion 13 in association with the retraction. Further, in the retraction mechanism 60, after the replacement of the inner pad 17 (and the outer pad 18), as described above, the returning member 64 can impart the restoring force to the piston 16 at a new reference position along with the advance of the piston 16. Accordingly, the piston 16 is returned by a retracting amount corresponding to the elastic deformation amount of the returning member 64.

Thus, the inner pad 17 (and the outer pad 18) is returned to a position with a predetermined clearance from the disc rotor 11, with the result that the drag phenomenon of the inner pad 17 and the outer pad 18 can be suppressed, and a stable brake feeling can be obtained.

As understood from the above description, according to the second embodiment, the reversing hydraulic pressure chamber 61, the seal member 62, and the communication passage 63 serving as the reversing means can impart the reversing force to the returning member 64 with use of the pressure of the brake fluid in the hydraulic pressure chamber 13a that is supplied for advancing the piston 16. Further, the returning member 64 is elastically deformed with use of the imparted reversing force, and can impart, to the piston 16, the restoring force generated along with the elastic deformation as the returning force. As a result, the piston 16 can be returned reliably.

Accordingly, also in the second embodiment, similarly to the first embodiment described above, the inner pad 17 and the outer pad 18 can be returned to a position with a predetermined clearance from the disc rotor 11. Thus, the drag phenomenon of the inner pad 17 and the outer pad 18 can be suppressed, and a stable brake feeling can be obtained.

F. First Modification Example of Second Embodiment

In the second embodiment described above, the present invention is carried out in the following manner. That is, the shear force generated along with the elastic deformation of the returning member 64, which exerts the restoring force imparting function, is imparted to the piston 16 as the restoring force. In this case, the present invention may be carried out in such a manner that the returning member 64 is compressed due to the reversing force (that is, retreating stroke) imparted from the reversing hydraulic pressure chamber 61 and the advancing force (that is, advancing stroke) of the piston 16, and an elastic force generated along with the compression and deformation is imparted to the piston 16 as the restoring force. In the following, a first modification example of the second embodiment is described in detail, but the same components as those in the second embodiment described above are represented by the same reference symbols, and description thereof is therefore omitted herein.

Similarly to the retraction mechanism 60 according to the second embodiment described above, a retraction mechanism 70 according the first modification example is provided to the piston 16 on the inner pad 17 side with respect to the seal groove 16e.

Figure 16:
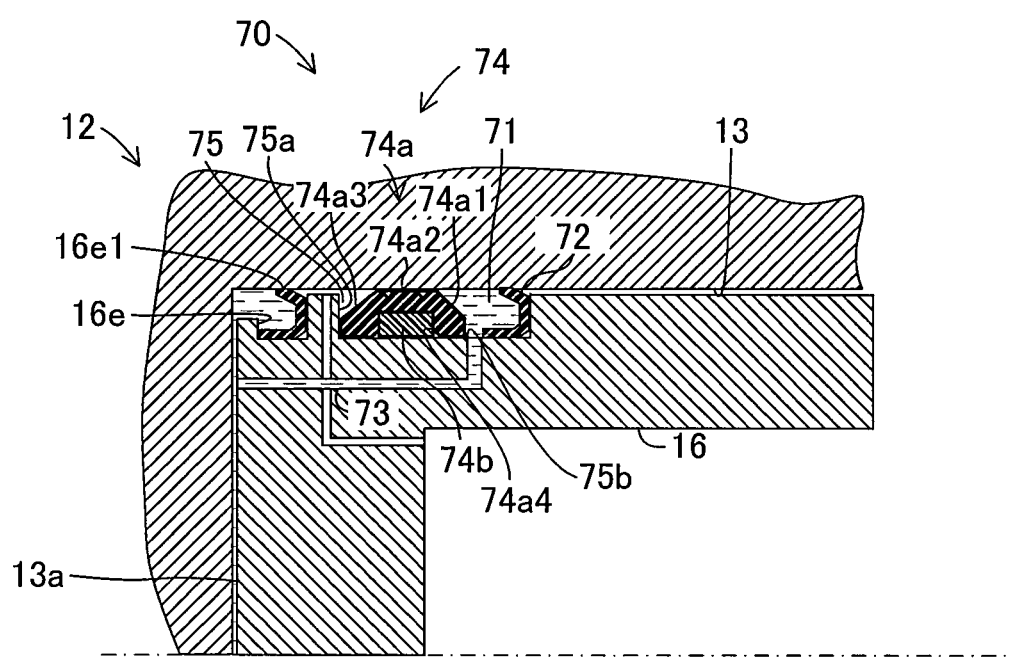
FIG. 16 is an enlarged schematic view for illustrating a retraction mechanism according to a first modification example of the second embodiment of the present invention.

Further, as illustrated in FIG. 16, the retraction mechanism 70 according to the first modification example includes an annular reversing hydraulic pressure chamber 71, which is formed in the outer peripheral surface of the piston 16, a seal member (for example, lip packing) 72, which is housed in the reversing hydraulic pressure chamber 71, for preventing leakage of the brake fluid at a position between the seal member 72 and the inner peripheral surface of the cylinder portion 13, and a communication passage 73, which communicates the reversing hydraulic pressure chamber 71 to the hydraulic pressure chamber 13a. Further, the retraction mechanism 70 has a housing groove 75 formed in the outer peripheral surface of the piston 16 at a position between the reversing hydraulic pressure chamber 71 and the seal groove 16e. The housing groove 75 houses a returning member 74.

As illustrated in FIG. 16, the returning member 74 according to the first modification example includes an elastic member 74a having the sealing function of preventing leakage of the brake fluid supplied to the reversing hydraulic pressure chamber 71, the frictional force generating function (deformation maintaining function) of generating a frictional force between the elastic member 74a and the inner peripheral surface of the cylinder portion 13, and the restoring force imparting function of generating a restoring force to be imparted to the piston 16, and a slider 74b having the reversing force transferring function of transferring a reversing force (retreating stroke) from the reversing hydraulic pressure chamber 71.

The elastic member 74a is molded into a ring shape from an elastic material (for example, rubber material). As illustrated in FIG. 16, the elastic member 74a includes a seal portion 74a1, which is opposed to the reversing hydraulic pressure chamber 71 under a state in which the elastic member 74a is housed in the housing groove 75 formed in the piston 16, a friction portion 74a2, which comes into contact with the inner peripheral surface of the cylinder portion 13 and generates a predetermined frictional force, and a returning portion 74a3, which is opposed to a pressing wall surface 75a of the housing groove 75. The seal portion 74a1 is molded into a substantially wedge-shaped cross section, and prevents leakage of the brake fluid supplied to the reversing hydraulic pressure chamber 71 at a position between the outer peripheral surface of the piston 16 and the inner peripheral surface of the cylinder portion 13. The friction portion 74a2 is held in contact with the inner peripheral surface of the cylinder portion 13 due to a predetermined pressing force. Note that, in this case, in order to increase the frictional force at an outer peripheral surface of the friction portion 74a2, for example, the outer peripheral surface is formed as a smooth surface. The returning portion 74a3 is molded into a substantially wedge-shaped cross section, and projects toward the pressing wall surface 75a of the housing groove 75. Further, the elastic member 74a has a housing groove 74a4 formed at a position between the seal portion 74a1 and the returning portion 74a3 and in an inner peripheral surface of the friction portion 74a2. The housing groove 74a4 houses the slider 74b.

The slider 74b is molded into a ring shape from a highly rigid, low friction material (for example, Teflon (trademark)) so as to be easily slidable along an inner peripheral wall surface 75b of the housing groove 75 without being deformed through the pressing of the friction portion 74a2 of the elastic member 74 due to a predetermined pressing force. Further, the slider 74b is housed in the housing groove 74a4 of the elastic member 74.

Next, an operation of the retraction mechanism 70 according to the first modification example structured as described above is described. When the brake fluid is supplied to the cylinder portion 13 and the brake fluid pressure in the hydraulic pressure chamber 13a is increased, the piston 16 advances toward the inner pad 17. On the other hand, in the retraction mechanism 70, along with the increase in brake fluid pressure in the hydraulic pressure chamber 13a of the cylinder portion 13, the brake fluid pressure is supplied through the communication passage 73, and the brake fluid pressure in the reversing hydraulic pressure chamber 71 that is sealed with the seal member 72 is increased.

Accordingly, the brake fluid pressure in the reversing hydraulic pressure chamber 71 is applied to the seal portion 74a1 of the elastic member 74a forming the returning member 74 as a reversing force for relatively shifting the seal portion 74a1 of the elastic member 74a in the retreating direction opposite to the advancing direction of the piston 16. That is, when the brake fluid pressure is supplied to the reversing hydraulic pressure chamber 71 that is sealed with the seal member 72, the reversing hydraulic pressure chamber 71 and the seal member 72 generate the reversing force (retreating stroke) to be imparted to the returning member 74 by reversing the brake fluid pressure for advancing the piston 16.

Figure 17:
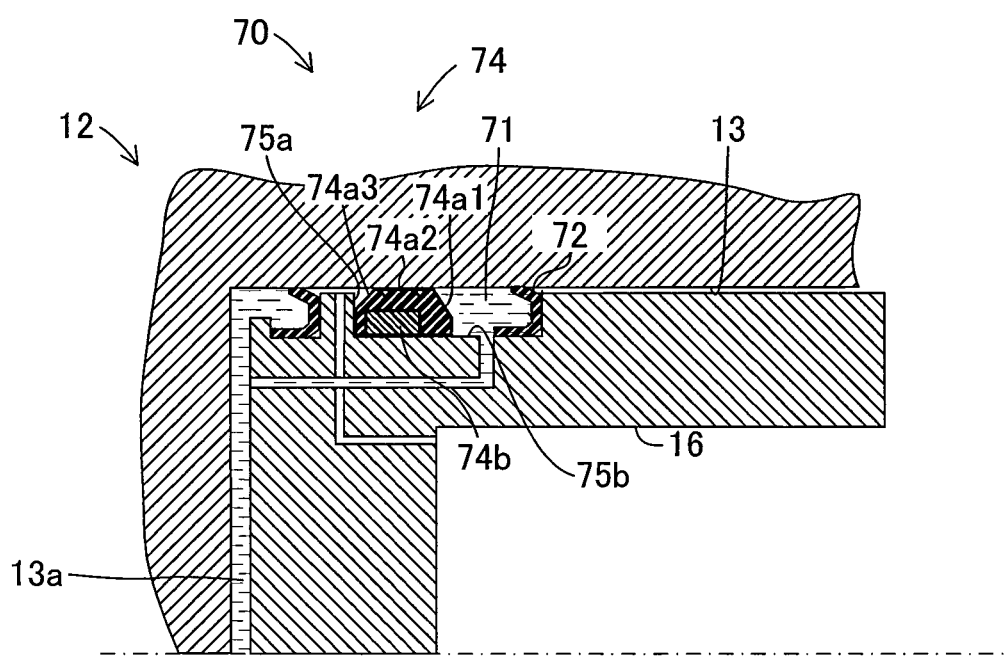
FIG. 17 is a view for illustrating that the retraction mechanism of FIG. 16 returns the piston when the advancing amount of the piston relative to the cylinder is small.

Further, in the returning member 74, when the seal portion 74a1 is pressed in the retreating direction of the piston 16 due to the reversing force imparted from the reversing hydraulic pressure chamber 71 as illustrated in FIG. 17, the slider 74b slides in a direction toward the returning portion 74a3 and presses the returning portion 74a3. At this time, the slider 74b is molded from the low friction material, and hence the frictional force between an inner peripheral surface of the slider 74b and the inner peripheral wall surface 75b of the housing groove 75 is small, with the result that the slider 74b can slide smoothly.

When the reversing force is thus transferred to the returning portion 74a3 through the slide of the slider 74b, in other words, the retreating stroke of the slider 74b, as illustrated in FIG. 17, the returning portion 74a3 is compressed and elastically deformed between the slider 74b that slides in the retreating direction of the piston 16 and the pressing wall surface 75a of the housing groove 75 that advances integrally with the piston 16. In this case, the returning portion 74a3 is molded to have its cross section shaped so as to project toward the pressing wall surface 75a, and hence the returning portion 74a3 can generate a large elastic force, that is, a large restoring force in accordance with the compression amount, that is, the elastic deformation amount. Further, the elastic deformation amount of the returning portion 74a3 corresponds to the returning amount (retracting amount) for returning the piston 16.

Further, in the retraction mechanism 70, the friction portion 74a2 of the elastic member 74a forming the returning member 74 is housed in the housing groove 75, and generates a predetermined frictional force between the friction portion 74a2 and the inner peripheral surface of the cylinder portion 13. Therefore, when the brake fluid pressure in the reversing hydraulic pressure chamber 71 is decreased and the reversing force is not imparted, the shift of the returning member 74 relative to the inner peripheral surface of the cylinder portion 13 is suppressed due to the frictional force that is generated by the friction portion 74a2, and the deformation of the returning portion 74a3 is maintained. Accordingly, in a situation in which the returning portion 74a3 is compressed and may therefore impart the restoring force, the restoring force generated by the returning portion 74a3 is transferred to the piston 16 via the pressing wall surface 75a of the housing groove 75, and is applied as the returning force for retreating the piston 16 in the direction separating from the inner pad 17.

Further, when the piston 16 advances due to an advancing force which is larger than the frictional force generated by the friction portion 74a2 of the returning member 74, the retraction mechanism 70 can be shifted in association with the piston 16. Accordingly, the piston 16 can be returned appropriately in accordance with the wear of the inner pad 17 and the outer pad 18.

Accordingly, also in the first modification example, similarly to the second embodiment described above, the inner pad 17 (and the outer pad 18) can be returned to a position with a predetermined clearance from the disc rotor 11. Thus, the drag phenomenon of the inner pad 17 and the outer pad 18 can be suppressed, and a stable brake feeling can be obtained.

g. Other Modification Examples in First Modification Example of Second Embodiment In the first modification example of the second embodiment described above, the present invention is carried out in the following manner. That is, the seal portion 74a1 and the returning portion 74a3 forming the elastic member 74a of the returning member 74 are both formed into a substantially wedge-shaped cross section. In this case, as described above, the seal portion 74a1 mainly exerts the sealing function, and the returning portion 74a3 mainly exerts the restoring force imparting function. Therefore, the present invention may be carried out in such a manner that the seal portion 74a1 and the returning portion 74a3 are changed in shape in accordance with those functions.

Figure 18:
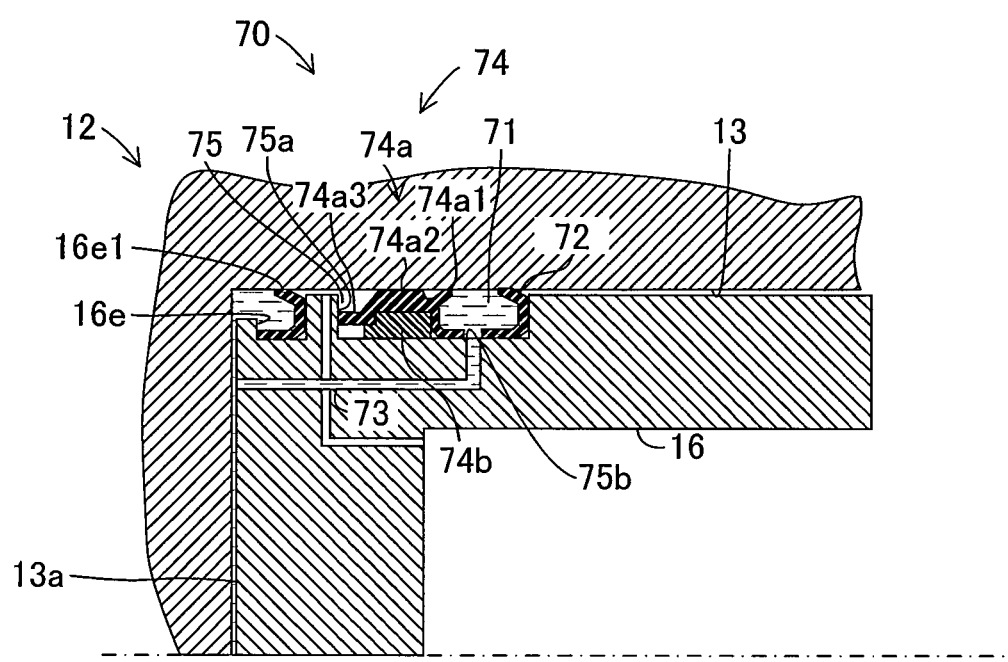
FIG. 18 is a view for illustrating a modification example of the retraction mechanism of FIG. 16.

For example, the present invention may be carried out in such a manner that, as illustrated in FIG. 18, the seal portion 74a1 is molded as a lip packing having a substantially U-shaped cross section (U-packing) or a lip packing (not shown) having a substantially V-shaped cross section (V-packing). Further, the present invention may be carried out in such a manner that the returning portion 74a3 is molded into a substantially rectangular toric cross section.

Figure 19:
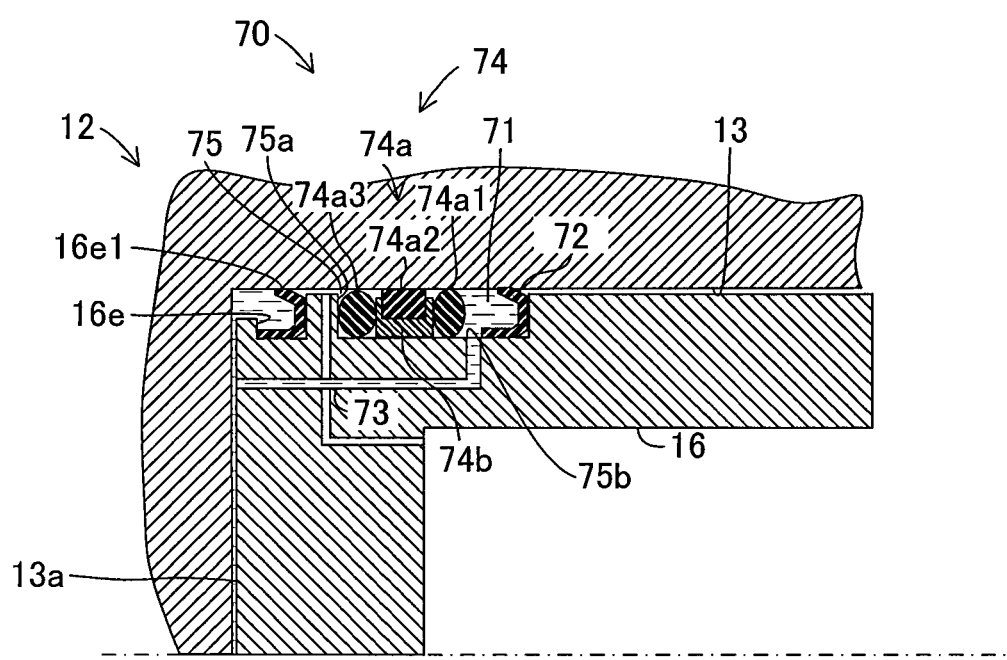
FIG. 19 is a view for illustrating another modification example of the retraction mechanism of FIG. 16.
Figure 20:
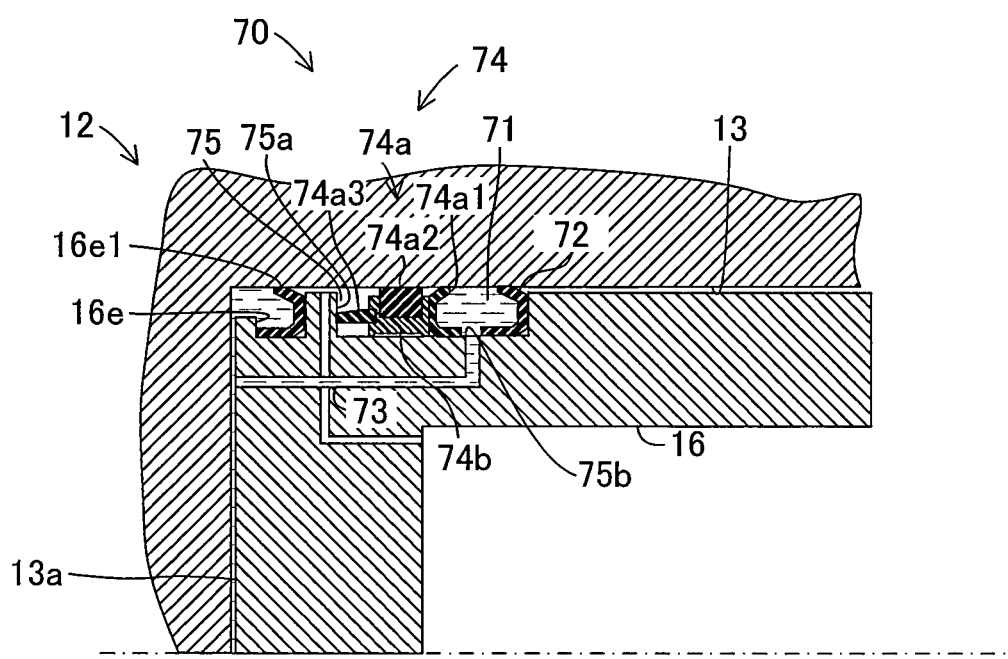
FIG. 20 is a view for illustrating still another modification example of the retraction mechanism of FIG. 16.

Further, for example, in the first modification of the second embodiment described above, the present invention is carried out in the following manner. That is, the elastic member 74a is molded so as to integrally have the sealing function, the frictional force generating function (deformation maintaining function), and the restoring force imparting function. Alternatively, the present invention may be carried out in such a manner that, as illustrated in FIGS. 19 and 20, the elastic member 74a is divided into members having those functions, respectively. In this manner, even when the members having the respective functions are housed in the housing groove 75, similar effects to those in the first modification example described above can be obtained.

h. Second Modification Example of Second Embodiment

In the second embodiment described above, the present invention is carried out in the following manner. That is, the shear force generated along with the elastic deformation of the returning member 64, which exerts the restoring force imparting function, is imparted to the piston 16 as the restoring force. In this case, the present invention may be carried out in such a manner that the returning member 64 is compressed by a movable element to which the reversing force is imparted from the reversing hydraulic pressure chamber 61 and the advancing force of the piston 16, and an elastic force generated along with the compression and deformation is imparted to the piston 16 as the restoring force. In the following, a second modification example of the second embodiment is described in detail, but the same components as those in the first embodiment, the third modification example of the first embodiment, and the second embodiment described above are represented by the same reference symbols, and description thereof is therefore omitted herein.

Figure 21:
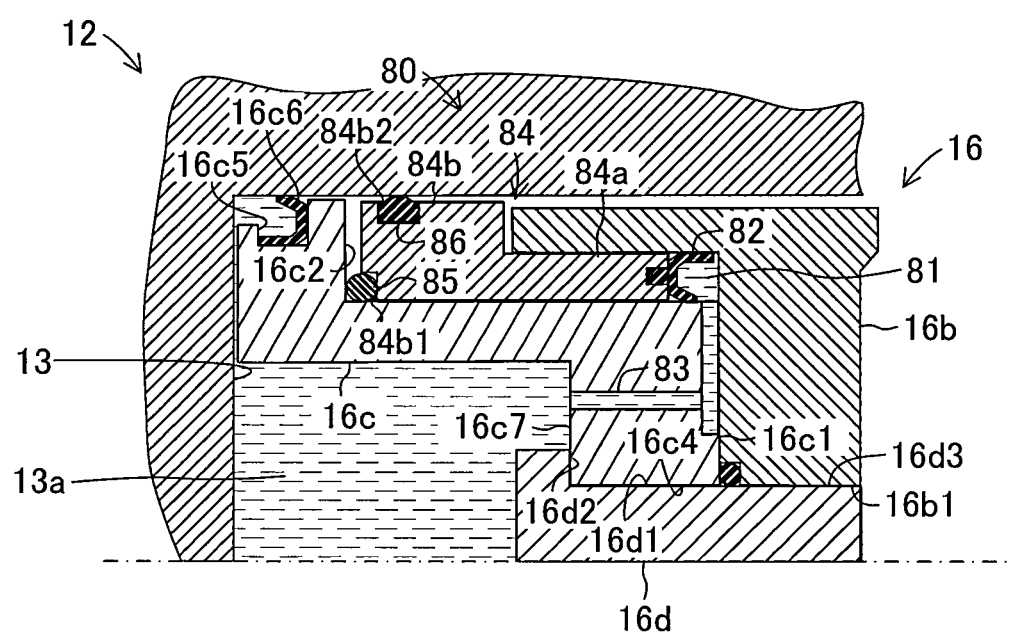
FIG. 21 is an enlarged schematic view for illustrating a retraction mechanism according to a second modification example of the second embodiment of the present invention.

In the second modification example of the second embodiment, as illustrated in FIG. 21, the piston 16 includes the pressing portion 16b, the first pressure receiving portion 16c, and the first pressure receiving portion 16d which is formed into a solid columnar shape. The first pressure receiving portion 16c includes the distal end portion 16c1, the stepped portion 16c2, and the coupling portion 16c3 for coupling the distal end portion 16c1 and the stepped portion 16c2 to each other. The distal end portion 16c1 has the through hole 16c4 formed therein, through which the second pressure receiving portion 16d is inserted. Further, the annular seal groove 16c5 is formed in the outer peripheral surface of the stepped portion 16c2. The seal groove 16c5 houses the seal member (for example, lip packing) 16c6 for preventing leakage of the brake fluid at a position between the seal member 16c6 and the inner peripheral surface of the cylinder portion 13.

The second pressure receiving portion 16d includes the main portion 16d1 which is fitted to the through hole 16c4 of the first pressure receiving portion 16c, the stepped portion 16d2 which is large in diameter and is formed on the hydraulic pressure chamber 13a side, and the firm-fixing portion 16d3 which is fastened with, for example, a screw in a fluid tight manner into the through hole 16b1 of the pressing portion 16b. Further, the stepped portion 16d2 is engageable with the engagement stepped portion 16c7 which is formed on the inner side of the first pressure receiving portion 16c.

The piston 16 according to the second modification example thus formed of the first pressure receiving portion 16c, the second pressure receiving portion 16d, and the pressing portion 16b is formed in the following manner. That is, the first pressure receiving portion 16c and the second pressure receiving portion 16d engage with each other through the use of the engagement stepped portion 16c7 and the stepped portion 16d2. Further, the distal end portion 16c1 abuts against the pressing portion 16b, and the firm-fixing portion 16d4 of the second pressure receiving portion 16d is integrally and firmly fixed to the pressing portion 16b. Therefore, when the brake fluid pressure in the hydraulic pressure chamber 13a is increased, the piston 16 moves in a direction of pressing the inner pad 17 integrally. Also in the second modification example, a retraction mechanism 80 is provided to the piston 16.

As illustrated in FIG. 21, the retraction mechanism 80 according to the second modification is provided to the piston 16 on the inner pad 17 side with respect to the seal groove 16c6. Further, the retraction mechanism 80 according to the second modification example includes an annular reversing hydraulic pressure chamber 81, which is formed of an outer peripheral surface of the first pressure receiving portion 16c and the outer side of the bottom surface of the pressing portion 16b, a seal member (for example, lip packing) 82 for preventing leakage of the brake fluid supplied to the reversing hydraulic pressure chamber 81, and a communication passage 83, which communicates the reversing hydraulic pressure chamber 81 to the hydraulic pressure chamber 13a. Further, the retraction mechanism 80 includes a movable element 84, a first elastic member 85, and a second elastic member 86. Note that, the movable element 84, the first elastic member 85, and the second elastic member 86 according to the second modification example are formed similarly to the movable element 22, the first elastic member 23, and the second elastic member 24 according to the first embodiment described above, respectively.

In this case, in the second modification example, the seal member 82 is arranged so as to have an opening toward the reversing hydraulic pressure chamber 81, and is assembled integrally with a thin portion 84a of the movable element 84 at a proximal end portion thereof. Accordingly, the seal member 82 is shiftable integrally with the movable element 84.

Figure 22:
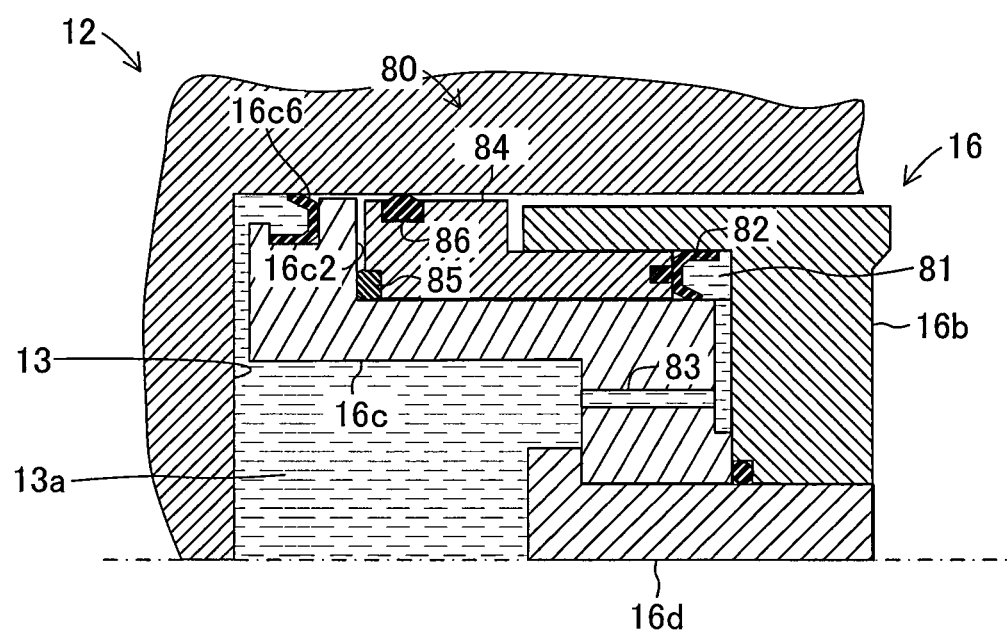
FIG. 22 is a view for illustrating that the retraction mechanism of FIG. 21 returns the piston when the advancing amount of the piston relative to the cylinder is small.

Next, an operation of the retraction mechanism 80 according to the second modification example structured as described above is described. When the brake fluid is supplied to the cylinder portion 13 and the brake fluid pressure in the hydraulic pressure chamber 13a is increased, the piston 16 advances toward the inner pad 17. On the other hand, in the retraction mechanism 80, along with the increase in brake fluid pressure in the hydraulic pressure chamber 13a of the cylinder portion 13, the brake fluid pressure is supplied through the communication passage 83, and the brake fluid pressure in the reversing hydraulic pressure chamber 81 that is sealed with the seal member 82 is increased. Accordingly, the brake fluid pressure in the reversing hydraulic pressure chamber 81 is applied to the movable element 84 as a reversing force for relatively shifting the movable element 84 in the retreating direction opposite to the advancing direction of the piston 16. That is, when the brake fluid pressure is supplied to the reversing hydraulic pressure chamber 81 that is sealed with the seal member 82, the reversing hydraulic pressure chamber 81 and the seal member 82 generate the reversing force to be imparted to the movable element 84 by reversing the brake fluid pressure for advancing the piston 16, to thereby relatively retreat the movable element 84 as illustrated in FIG. 22.

Further, in the retraction mechanism 80, the first elastic member 85 is arranged between a housing stepped portion 84b1 formed in a thick portion 84b of the movable element 84 and the stepped portion 16c2 of the first pressure receiving portion 16c. Therefore, when the movable element 84 subjected to the reversing force imparted from the reversing hydraulic pressure chamber 81 retreats relative to the advance of the first pressure receiving portion 16c (that is, piston 16), as illustrated in FIG. 22, the first elastic member 85 is compressed and elastically deformed between the movable element 84 and the stepped portion 16c2. That is, the movable element 84 exerts the reversing force transferring function of transferring the reversing force from the reversing hydraulic pressure chamber 81 to the first elastic member 85.

Accordingly, the first elastic member 85 can impart an elastic force (restoring force) in accordance with a relative shift amount between the movable element 84 and the first pressure receiving portion 16c, in other words, a compression amount, to the movable element 84 and the stepped portion 16c2. Further, the relative shift amount of the movable element 84 to the first pressure receiving portion 16c, which is restricted by the maximum elastic deformation amount of the first elastic member 85, corresponds to the returning amount (retracting amount) for returning the first pressure receiving portion 16c (piston 16).

Further, in the retraction mechanism 80, the second elastic member 86 is housed in a housing groove portion 84b2 formed in the thick portion 84b of the movable element 84, and generates a predetermined frictional force between the second elastic member 86 and the inner peripheral surface of the cylinder portion 13. Therefore, when the brake fluid pressure in the reversing hydraulic pressure chamber 81 is decreased and the reversing force is not imparted to the movable element 84, the shift of the movable element 84 relative to the inner peripheral surface of the cylinder portion 13 is suppressed due to the frictional force that is generated by the second elastic member 86, and the deformation of the first elastic member 85 is maintained. That is, the second elastic member 86 exerts the frictional force generating function (deformation maintaining function). Accordingly, in a situation in which the first elastic member 85 is compressed and may therefore impart the restoring force, the restoring force generated by the first elastic member 85 is transferred to the first pressure receiving portion 16c via the stepped portion 16c2, and is applied as the returning force for retreating the piston 16 in the direction separating from the inner pad 17.

Further, when the piston 16 advances due to an advancing force which is larger than the frictional force generated by the second elastic member 86, the retraction mechanism 80 can be shifted in association with the piston 16. Accordingly, the piston 16 can be returned appropriately in accordance with the wear of the inner pad 17 and the outer pad 18.

Accordingly, also in the second modification example, similarly to the second embodiment described above, the inner pad 17 (and the outer pad 18) can be returned to a position with a predetermined clearance from the disc rotor 11. Thus, the drag phenomenon of the inner pad 17 and the outer pad 18 can be suppressed, and a stable brake feeling can be obtained.

i. Third Embodiment

In the embodiments and their modification examples described above, the present invention is carried out in the following manner. That is, each of the retraction mechanisms 20 to 80 for retreating the piston 16 is provided on the outer peripheral side of the piston 16. In this case, the present invention may be carried out in such a manner that the retraction mechanism is provided on the inner peripheral side of the piston 16. In the following, a third embodiment of the present invention is described, but the same components as those in the embodiments and their modification examples described above are represented by the same reference symbols, and description thereof is therefore omitted herein.

Figure 23:
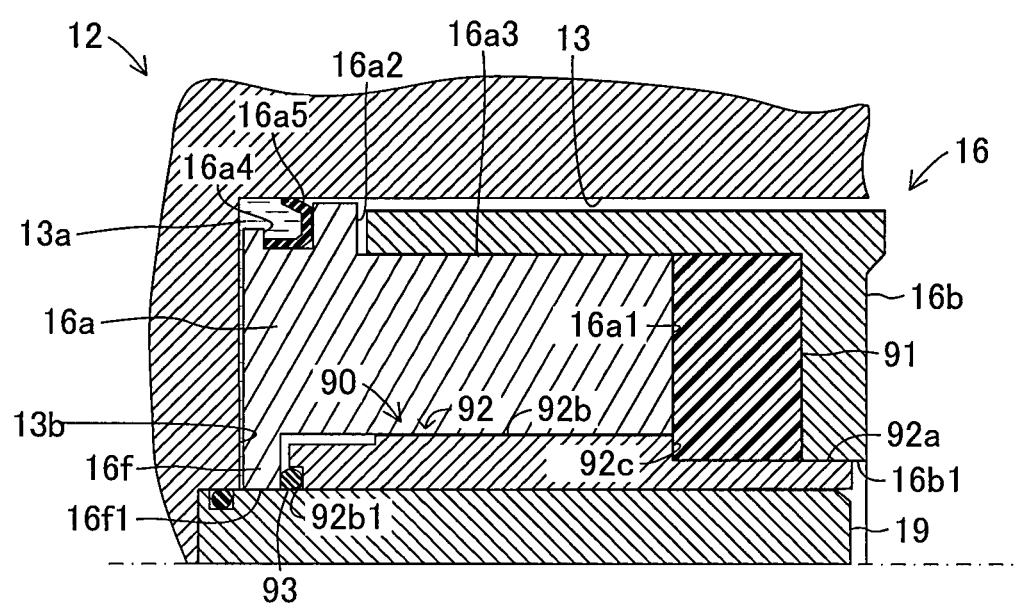
FIG. 23 is an enlarged schematic view for illustrating a retraction mechanism according to a third embodiment of the present invention.

Also in the third embodiment, as illustrated in FIG. 23, the piston 16 includes the pressure receiving portion 16a and the pressing portion 16b. Note that, the pressure receiving portion 16a according to the third embodiment is formed into a bottomed cylindrical shape, and has a through hole 16f1 formed at a substantially center part of a bottom surface 16f of the pressure receiving portion 16a. Further, in the third embodiment, the inner peripheral surface of the pressing portion 16b is frictionally slidable along the outer peripheral surface of the coupling portion 16a3.

Note that, in the third embodiment, the columnar distal end portion of the pressure receiving portion 16a according to the first embodiment described above is omitted. Therefore, in the following description, the first stepped portion 16a1 of the pressure receiving portion 16a according to the first embodiment described above is referred to as "distal end portion 16a1", and the second stepped portion 16a2 of the pressure receiving portion 16a is referred to as "stepped portion 16a2". Other components of the pressure receiving portion 16a are respectively referred to as "coupling portion 16a3", "seal groove 16a4", and "seal member 16a5" similarly to the first embodiment described above.

Further, in the third embodiment, as illustrated in FIG. 23, there is provided a center shaft 19, which has a proximal end portion integrally and firmly fixed to a bottom surface 13b of the cylinder portion 13 in a fluid tight manner and extends in the advancing and retreating direction of the piston 16. The center shaft 19 passes through the through hole 16f1 formed in the bottom surface 16f of the pressure receiving portion 16a and through the through hole 16b1 formed in the pressing portion 16b. Further, a retraction mechanism 90 according to the third embodiment is assembled inside the piston 16 through an intermediation of the center shaft 19.

The retraction mechanism 90 includes a reversing member 91, which is arranged between the distal end portion 16a1 formed in the pressure receiving portion 16a of the piston 16 and the inner peripheral surface of the pressing portion 16b of the piston 16. The reversing member 91 is assembled onto an outer peripheral surface of a thin portion 92a of a movable element 92 described later, and is formed into a disc shape having a predetermined thickness from a viscoelastic material (for example, rubber material which is small in hardness). The reversing member 91 is molded so as to have an outer diameter smaller than the inner diameter of the pressing portion 16b.

The movable element 92 is assembled onto an outer peripheral surface of the center shaft 19 so as to be capable of advancing and retreating, and is formed into a cylindrical shape (sleeve shape) including the thin portion 92a housed between the outer peripheral surface of the center shaft 19 and a region ranging from the through hole 16b1 of the pressing portion 16b to an inner peripheral surface of the reversing member 91, and a thick portion 92b housed between the outer peripheral surface of the center shaft 19 and an inner peripheral surface of the pressure receiving portion 16a. Further, the movable element 92 includes an abutment stepped portion 92c, which couples the thin portion 92a and the thick portion 92b to each other and abuts against the reversing member 91.

Further, similarly to the movable element 22 according to the first embodiment described above, the movable element 92 of the retraction mechanism 90 includes a first elastic member 93, which is housed in a housing stepped portion 92b1 formed on an inner peripheral surface side of the thick portion 92b of the movable element 92. The first elastic member 93 is molded into a ring shape from a highly elastic material (for example, rubber material). When the first elastic member 93 is elastically deformed by an inner peripheral surface of the housing stepped portion 92b1 of the movable element 92 and by the bottom surface 16f of the pressure receiving portion 16a, the first elastic member 93 generates an elastic force (restoring force) in accordance with the elastic deformation. Note that, as the first elastic member 93, an O-ring having a substantially O-shaped cross section or a D-ring (not shown) having a substantially D-shaped cross section may be employed.

Figure 24:
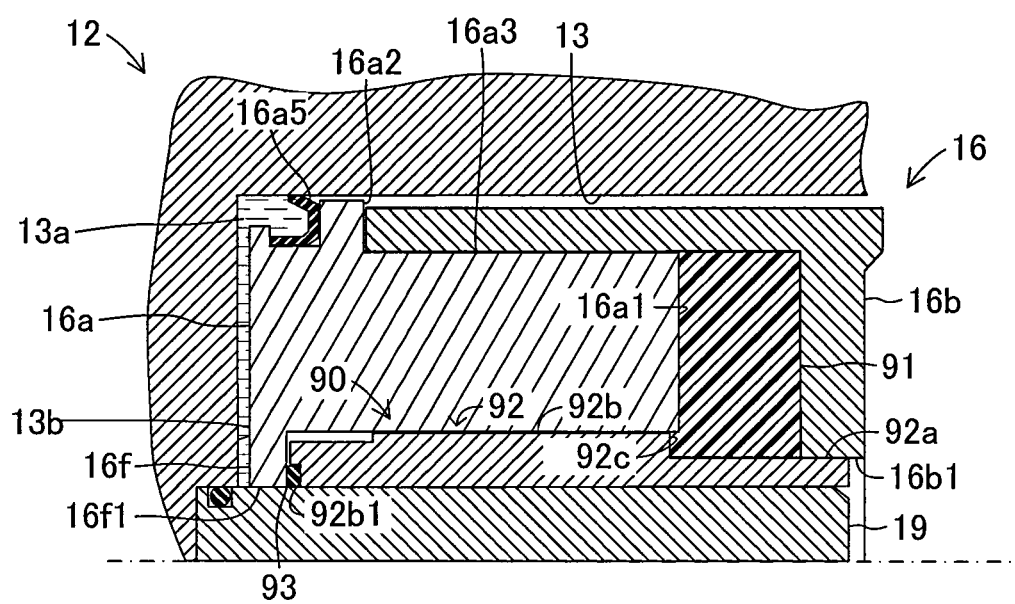
FIG. 24 is a view for illustrating that the retraction mechanism of FIG. 23 returns the piston when the advancing amount of the piston relative to the cylinder is small.

Next, a basic operation of the retraction mechanism 90 structured as described above is described. In the retraction mechanism 90, when the brake fluid is supplied to the cylinder portion 13 and the brake fluid pressure in the hydraulic pressure chamber 13a is increased, the pressure receiving portion 16a of the piston 16 advances toward the pressing portion 16b. When the pressing portion 16b presses the inner pad 17 to bring the inner pad 17 into press contact with the friction surface of the disc rotor 11, as illustrated in FIG. 24, in accordance with the brake fluid pressure in the hydraulic pressure chamber 13a, the pressure receiving portion 16a compresses the reversing member 91 by the distal end portion 16a1 thereof. Accordingly, due to a viscoelastic characteristic of the reversing member 91, the reversing member 91 applies a reversing force to the engagement stepped portion 92c of the movable element 92 so as to relatively shift the engagement stepped portion 92c of the movable element 92 in the retreating direction opposite to the advancing direction of the pressure receiving portion 16a (piston 16).

More specifically, the reversing member 91 is housed in a housing space surrounded by the outer peripheral surface of the thin portion 92a of the movable element 92 and the inner peripheral surface of the pressing portion 16b, which are formed as non-deformable members, and further surrounded by the distal end portion 16a1 of the pressure receiving portion 16a and the engagement stepped portion 92c of the movable element 22, which are shiftable in the advancing and retreating directions of the piston 16. Therefore, in order to relieve, from the housing space, the part of the reversing member 91 corresponding to a volume of the distal end portion 16a1 of the pressure receiving portion 16a which enters the housing space, the reversing member 91 made of the viscoelastic material is deformed so as to push back the engagement stepped portion 92c of the movable element 92. That is, the reversing member 91 exerts the reversing force generating function of generating the reversing force to be imparted to the movable element 92 by reversing the advancing force (brake fluid pressure) for advancing the pressure receiving portion 16a.

At this time, as illustrated in FIG. 24, an area of contact of the engagement stepped portion 92c with the reversing member 91 is set smaller than an area of contact of the distal end portion 16a1 with the reversing member 91. Therefore, when the distal end portion 16a1 enters the housing space, the reversing member 91 relatively shifts the movable element 92 in the direction opposite to the advancing direction of the pressure receiving portion 16a (piston 16), that is, in the retreating direction of the pressure receiving portion 16a (piston 16), by the pushback amount (retreating stroke amount) larger than the entrance amount (advancing stroke amount) of the distal end portion 16a1.

Further, in the retraction mechanism 90, the first elastic member 93 is arranged between the housing stepped portion 92b1 formed in the thick portion 92b of the movable element 92 and the bottom surface 16f of the pressure receiving portion 16a. Therefore, when the movable element 92 subjected to the reversing force imparted from the reversing member 91 retreats relative to the advance of the pressure receiving portion 16a, the first elastic member 93 is compressed and elastically deformed between the movable element 92 and the bottom surface 16f of the pressure receiving portion 16a. That is, the movable element 92 exerts the reversing force transferring function of transferring the reversing force from the reversing member 21 to the first elastic member 93.

Accordingly, the first elastic member 93 can impart an elastic force (restoring force) in accordance with a relative shift amount between the movable element 92 and the pressure receiving portion 16a, in other words, a compression amount, to the movable element 92 and the bottom surface 16f of the pressure receiving portion 16a. Thus, the first elastic member 93 exerts the restoring force imparting function. In this case, the relative shift amount of the movable element 92 to the pressure receiving portion 16a is restricted by the maximum elastic deformation amount of the first elastic member 93 (or abutment between a distal end of the housing stepped portion 92a and the bottom surface 16f). That is, the relative shift amount of the movable element 92 to the pressure receiving portion 16a, which is restricted by the maximum elastic deformation amount of the first elastic member 93, corresponds to the returning amount (retracting amount) for returning the pressure receiving portion 16a (piston 16).

Further, in the retraction mechanism 90, the abutment stepped portion 92c of the movable element 92 is constantly held in contact with the reversing member 91 that is deformed through the entrance of the distal end portion 16a1 of the pressure receiving portion 16a, and the movable element 92 is constantly subjected to the reversing force imparted from the reversing member 91. Therefore, even when the brake fluid pressure in the hydraulic pressure chamber 13*a* is decreased, as long as the pressure receiving portion 16*a* does not retreat, the shift of the movable element 92 relative to the center shaft 19 is suppressed due to the reversing force imparted from the reversing member 91, and the deformation of the first elastic member 93 is maintained. Accordingly, in a situation in which the first elastic member 93 is compressed and may therefore impart the restoring force, the shift of the movable element 92 is suppressed, and hence the restoring force generated by the first elastic member 93 is transferred to the pressure receiving portion 16*a* via the bottom surface 16*f*, and is applied as the returning force for retreating the piston 16 in the direction separating from the inner pad 17.

By the way, also in the third embodiment, in response to the advance and retreat of the pressure receiving portion 16*a* and the pressing portion 16*b* (that is, piston 16), the retraction mechanism 90 moves in association with the piston 16 and returns the piston 16 corresponding to the magnitude of the brake fluid pressure in the hydraulic pressure chamber 13*a* and the wear state of the inner pad 17 (and the outer pad 18). In the following, the operation of the retraction mechanism 90 is described in detail.

First, description is given of a case where the brake fluid pressure in the hydraulic pressure chamber 13*a* is low at the time of pressurization. In this case, as illustrated in FIG. 24, when the pressure receiving portion 16*a* of the piston 16 advances in response to the increase in brake fluid pressure in the hydraulic pressure chamber 13*a* and the distal end portion 16*a*1 enters the housing space, the reversing member 91 is compressed. Then, the reversing member 91 imparts the reversing force to the movable element 92 along with the compression.

The movable element 92 retreats relative to the advancing pressure receiving portion 16*a* due to the reversing force imparted from the reversing member 91 (more specifically, is not shifted), and compresses the first elastic member 93 together with the bottom surface 16*f* of the pressure receiving portion 16*a*. Note that, in this case, the brake fluid pressure in the hydraulic pressure chamber 13*a* is low, and hence the first elastic member 93 is elastically deformed by an elastic deformation amount that is smaller than the maximum elastic deformation amount, and imparts a restoring force in accordance with this elastic deformation amount to the movable element 92 and the bottom surface 16*f*.

Even when the brake fluid pressure in the hydraulic pressure chamber 13*a* is removed in this state, the shift of the movable element 92 is suppressed due to the reversing force imparted from the reversing member 91. As a result, the restoring force generated by the first elastic member 93 is imparted to the pressure receiving portion 16*a* via the bottom surface 16*f* so that the pressure receiving portion 16*a* retreats. Further, the pressing portion 16*b* is coupled to the coupling portion 16*a*3 of the pressure receiving portion 16*a* via the inner peripheral surface thereof so as to be frictionally slidable along the coupling portion 16*a*3, and hence retreats integrally with the pressure receiving portion 16*a*. Accordingly, the pressure receiving portion 16*a* and the pressing portion 16*b*, that is, the piston 16, are returned by a retracting amount corresponding to the elastic deformation amount of the first elastic member 93.

Next, when the brake fluid pressure in the hydraulic pressure chamber 13*a* is high at the time of pressurization, as illustrated in FIG. 24, due to the reversing force imparted from the reversing member 91, the movable element 92 elastically deforms the first elastic member 93 up to the maximum elastic deformation amount (or until the distal end of the housing stepped portion 92*a* of the movable element 92 abuts against the bottom surface 16*f*) together with the bottom surface 16*f* of the pressure receiving portion 16*a*. When the brake fluid pressure in the hydraulic pressure chamber 13*a* is removed in this state, due to the restoring force generated by the first elastic member 93, the pressure receiving portion 16*a* and the pressing portion 16*b*, that is, the piston 16, are returned by a retracting amount corresponding to the maximum elastic deformation amount of the first elastic member 93.

Figure 25:
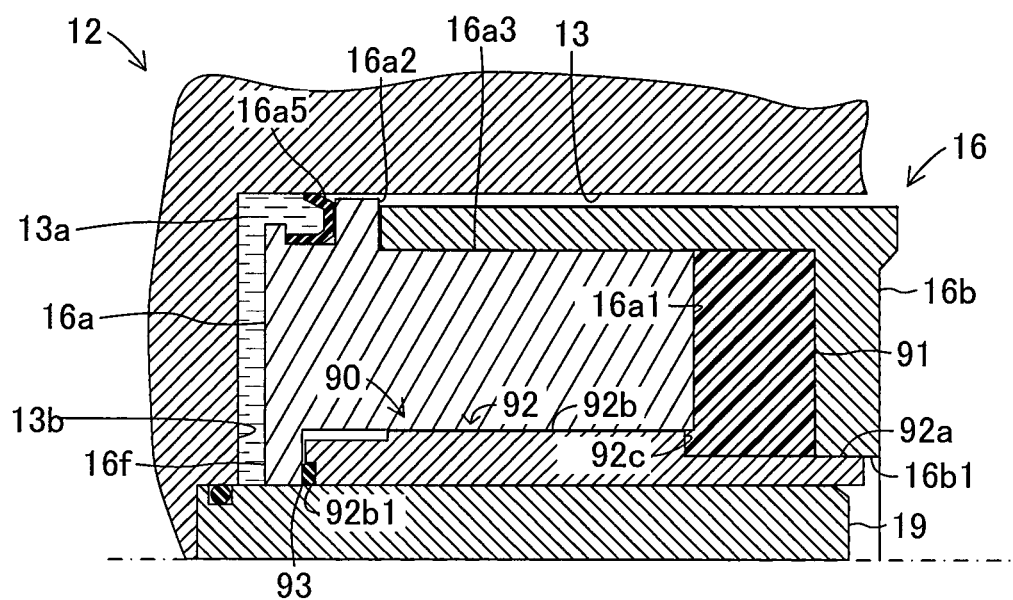
FIG. 25 is a view for illustrating that the retraction mechanism of FIG. 23 returns the piston when the advancing amount of the piston relative to the cylinder is large.

Further, when the brake fluid pressure in the hydraulic pressure chamber 13*a* is excessively high at the time of pressurization, the advancing amount of the pressure receiving portion 16*a* and the pressing portion 16*b* is increased to a higher extent than in a predetermined setting. In this case, in a situation in which the first elastic member 93 is elastically deformed up to the maximum elastic deformation amount (or in a situation in which the distal end of the housing stepped portion 92*a* of the movable element 92 abuts against the bottom surface 16*f*), the movable element 92 cannot retreat relative to the pressure receiving portion 16*a*. Thus, in this case, as illustrated in FIG. 25, the retraction mechanism 90 advances in association with the advance of the pressure receiving portion 16*a* and the pressing portion 16*b*. However, when the brake fluid pressure in the hydraulic pressure chamber 13*a* is removed in this state, due to the restoring force generated by the first elastic member 93, the pressure receiving portion 16*a* and the pressing portion 16*b*, that is, the piston 16, are returned by a retracting amount corresponding to the maximum elastic deformation amount of the first elastic member 93.

Next, description is given of an operation of the retraction mechanism 90 for moving in association with the piston 16 and returning the piston 16 corresponding to the wear state of the inner pad 17 (and the outer pad 18). First, description is given of a case where the wear of the inner pad 17 (more specifically, wear of the friction material 17*a*) is significant. When the wear of the inner pad 17 is significant, as described above, there is an increase in advancing amount of the piston 16, that is, the pressure receiving portion 16*a* and the pressing portion 16*b*, which advances in accordance with the brake fluid pressure in the hydraulic pressure chamber 13*a* of the cylinder portion 13.

Therefore, the retraction mechanism 90 advances in association with the advance of the pressure receiving portion 16*a* until the pressing portion 16*b* presses the inner pad 17 to bring the inner pad 17 into press contact with the friction surface of the disc rotor 11. That is, in this case, when the pressure receiving portion 16*a* causes the pressing portion 16*b* to advance toward the inner pad 17 in accordance with the brake fluid pressure, the pressing portion 16*b* does not stop until the pressing portion 16*b* brings the inner pad 17 into press contact with the friction surface of the disc rotor 11. Therefore, the pressure receiving portion 16*a* causes the pressing portion 16*b* to advance toward the inner pad 17 without compressing the reversing member 91 between the distal end portion 16*a*1 and the inner peripheral surface of the pressing portion 16*b*. Thus, the reversing member 91 does not impart the reversing force to the movable element 92, and hence the movable element 92 advances in association with the pressure receiving portion 16*a* while involving, for example, the elastic deformation of the first elastic member 93 between the movable element 92 and the bottom surface 16*f* of the pressure receiving portion 16*a*.

When the pressing portion 16*b* in this state starts pressing the inner pad 17 to bring the inner pad 17 into press contact with the friction surface of the disc rotor 11, as illustrated in FIG. 25, the distal end portion 16a1 of the pressure receiving portion 16a starts entering the housing space along with the increase in brake fluid pressure in the hydraulic pressure chamber 13a, and as a result, the reversing member 91 is compressed and imparts the reversing force to the movable element 92. Accordingly, with respect to a new reference position which is set to the position advanced through the above-mentioned associative movement, the movable element 92 retreats relative to the advancing pressure receiving portion 16a due to the reversing force imparted from the reversing member 91 (more specifically, is not shifted), and compresses the first elastic member 93 up to, for example, the maximum elastic deformation amount together with the bottom surface 16f of the pressure receiving portion 16a. Then, the first elastic member 93 imparts a restoring force in accordance with the maximum elastic deformation amount to the movable element 92 and the bottom surface 16f.

Even when the brake fluid pressure in the hydraulic pressure chamber 13a is removed in this state, the shift of the movable element 92 from the above-mentioned new reference position is suppressed due to the reversing force imparted from the reversing member 91. As a result, the restoring force generated by the first elastic member 93 is imparted to the pressure receiving portion 16a via the bottom surface 16f so that the pressure receiving portion 16a retreats. Further, the pressing portion 16b is coupled to the coupling portion 16a3 of the pressure receiving portion 16a via the inner peripheral surface thereof so as to be frictionally slidable along the coupling portion 16a3, and hence retreats integrally with the pressure receiving portion 16a. Accordingly, the pressure receiving portion 16a and the pressing portion 16b, that is, the piston 16, are returned by a retracting amount corresponding to the elastic deformation amount of the first elastic member 93. Accordingly, the inner pad 17 (and the outer pad 18) is returned to a position with a predetermined clearance from the disc rotor 11. Thus, the drag phenomenon of the inner pad 17 and the outer pad 18 can be suppressed, and a stable brake feeling can be obtained.

On the other hand, when the inner pad 17 (and the outer pad 18) thus worn out is replaced with a new inner pad 17 (and outer pad 18), as described above, there is a decrease in advancing amount of the piston 16, which advances in accordance with the brake fluid pressure in the hydraulic pressure chamber 13a of the cylinder portion 13.

Therefore, when the piston 16 is forcibly retracted to the inner side of the cylinder portion 13 along with the replacement of the inner pad 17 (and the outer pad 18), the retraction mechanism 90 also moves to the inner side of the cylinder portion 13 in association with the retraction. Further, in the retraction mechanism 90, after the replacement of the inner pad 17 (and the outer pad 18), as described above, the first elastic member 93 can impart the restoring force to the piston 16 at a new reference position along with the advance of the piston 16. Accordingly, the piston 16 is returned by a retracting amount corresponding to the elastic deformation amount of the first elastic member 93.

Thus, the inner pad 17 (and the outer pad 18) is returned to a position with a predetermined clearance from the disc rotor 11, with the result that the drag phenomenon of the inner pad 17 and the outer pad 18 can be suppressed, and a stable brake feeling can be obtained.

As understood from the above description, according to the third embodiment, the retraction mechanism 90 may be provided inside the piston 16 through the intermediation of the center shaft 19 that is integrally and firmly fixed to the cylinder portion 13 of the caliper 12. Further, also in the retraction mechanism 90, the reversing member 91 serving as the reversing means can impart the reversing force to the first elastic member 93 via the movable element 92 with use of the pressure of the brake fluid in the hydraulic pressure chamber 13a that is supplied for advancing the piston 16. Then, the first elastic member 93 is elastically deformed with use of the imparted reversing force, and can impart, to the piston 16, the restoring force generated along with the elastic deformation as the returning force. As a result, the piston 16 can be returned reliably.

Accordingly, also in the third embodiment, similarly to the embodiments described above, the inner pad 17 and the outer pad 18 can be returned to a position with a predetermined clearance from the disc rotor 11. Thus, the drag phenomenon of the inner pad 17 and the outer pad 18 can be suppressed, and a stable brake feeling can be obtained.

Further, the retraction mechanism 90 may be provided inside the piston 16 through the intermediation of the center shaft that is integrally and firmly fixed to the cylinder portion 13 of the caliper 12. Accordingly, as compared to the case where the retraction mechanism is provided onto the outer peripheral surface of the piston 16, the piston 16 can be reduced in size, and as a result, the cylinder portion 13 that houses the piston 16 can also be reduced in size. Thus, the caliper 12 can be reduced in size and weight.

Note that, also in the third embodiment, for example, similarly to the second embodiment described above, the present invention may be carried out in such a manner that the brake fluid pressure in the hydraulic pressure chamber 13a is directly used for generating the reversing force (or the retreating stroke). In this case, it is only necessary that the retraction mechanism 90 include, for example, a reversing hydraulic pressure chamber formed similarly to the annular reversing hydraulic pressure chamber 81 of the retraction mechanism 80 according to the second modification example of the second embodiment described above so that the movable element 92 is subjected to the reversing force imparted from the reversing hydraulic pressure chamber. Also with this structure, the reversing force can be imparted to the first elastic member 93 via the movable element 92. Then, the first elastic member 93 is elastically deformed with use of the imparted reversing force, and can impart, to the piston 16, the restoring force generated along with the elastic deformation as the returning force. As a result, the piston 16 can be returned reliably.

The present invention is not limited to the embodiments and their modification examples described above, and various modifications may be made thereto without departing from the object of the present invention.

For example, in the embodiments and their modification examples described above, each of the retraction mechanisms 20 to 90 is applied to the floating caliper disc brake device, in which the piston 16 presses the inner pad 17 alone. In this case, the present invention may be carried out by employing a fixed caliper disc brake device including pistons 16 for pressing the inner pad 17 and the outer pad 18 individually. In this case, retraction mechanisms 20 to 90 formed similarly to those in the embodiments and their modification examples described above are provided to the pistons 16 for pressing the inner pad 17 and the outer pad 18, respectively, and accordingly similar effects to those in the embodiments and their modification examples described above can be obtained.

The invention claimed is:

1. A disc brake device, comprising:
a disc rotor which rotates integrally with a wheel about a rotational axis; and
a caliper including
  a piston for pressing friction pads, which are opposed to friction surfaces of the disc rotor, toward the friction surfaces along with an increase in pressure of a brake fluid, and
  a cylinder for supporting the piston in a fluid tight manner so as to allow the piston to advance and retreat;
the disc brake device further comprising a retraction mechanism provided to the piston,
wherein the piston includes
  a pressure receiving portion including a first stepped portion and a coupling portion, and
  a pressing portion frictionally and slidably coupled to the pressure receiving portion so as to retreat integrally with the pressure receiving portion, and
wherein the retraction mechanism includes
  a disc-like reversing member made of a viscoelastic material, arranged between an outer surface of the first stepped portion and an inner surface of the pressing portion opposed to the outer surface of the first stepped portion, the disc-like reversing member having an outer diameter larger than an outer diameter of the first stepped portion and an inner diameter equal to an inner diameter of the first stepped portion,
  a movable element formed into a cylindrical shape, assembled onto an outer peripheral surface of the coupling portion so as to be capable of advancing and retreating, a first end of the movable element being abuttable against the reversing member,
  a first elastic member, arranged between a second end of the movable element and the pressure receiving portion of the piston, so as to generate a restoring force in accordance with an elastic deformation of the first elastic member caused by the movable element and the pressure receiving portion,
  a second elastic member, housed in an annular housing groove portion formed on an outer peripheral surface of the movable element so as to generate a compressing force between an inner surface of the cylinder and an inner peripheral surface of the housing groove portion of the movable element, such that the second elastic member generates a predetermined magnitude of frictional force against a movement of the movable element.

* * * * *